United States Patent
Stephens et al.

[19]

[11] Patent Number: 6,071,207
[45] Date of Patent: Jun. 6, 2000

[54] FULL-TIME TRANSFER CASE WITH MODE SHIFT ARRANGEMENT

[75] Inventors: Carl F. Stephens, Dewitt; Robert J. Wilson, Warners; Brent A. Cring, Ontario, all of N.Y.

[73] Assignee: New Venture Gear, Inc., Troy, Mich.

[21] Appl. No.: 08/909,327

[22] Filed: Aug. 11, 1997

Related U.S. Application Data

[63] Continuation-in-part of application No. 08/410,910, Mar. 27, 1995, Pat. No. 5,655,618, which is a continuation of application No. 08/230,122, Apr. 19, 1994, Pat. No. 5,400,866, which is a continuation-in-part of application No. 08/028,952, Mar. 10, 1993, Pat. No. 5,323,871.

[51] Int. Cl.$^7$ .................................................... F16H 48/30
[52] U.S. Cl. ............................................................. 475/204
[58] Field of Search .................................... 475/223, 225, 475/203, 204, 206

[56] References Cited

U.S. PATENT DOCUMENTS

| | | |
|---|---|---|
| 4,417,641 | 11/1983 | Kageyama . |
| 4,484,653 | 11/1984 | Horikoski et al. . |
| 4,711,317 | 12/1987 | Sakakiyama . |
| 4,757,870 | 7/1988 | Torii et al. . |
| 4,773,500 | 9/1988 | Naito et al. . |
| 4,776,424 | 10/1988 | Naito . |
| 4,846,298 | 7/1989 | Naito . |
| 4,887,689 | 12/1989 | Naito . |
| 4,895,236 | 1/1990 | Sakakibara et al. . |
| 4,989,686 | 2/1991 | Miller et al. . |
| 5,033,575 | 7/1991 | Takeshita et al. . |
| 5,046,576 | 9/1991 | Miyawaki . |
| 5,046,998 | 9/1991 | Frost . |
| 5,078,660 | 1/1992 | Williams et al. . |
| 5,152,362 | 10/1992 | Naito . |
| 5,159,847 | 11/1992 | Williams et al. . |
| 5,199,325 | 4/1993 | Reuter et al. . |
| 5,226,860 | 7/1993 | Baxter, Jr. et al. . |
| 5,323,871 | 6/1994 | Wilson et al. . |
| 5,400,866 | 3/1995 | Wilson et al. . |
| 5,582,263 | 12/1996 | Varma et al. . |
| 5,655,618 | 8/1997 | Wilson et al. . |
| 5,655,986 | 8/1997 | Wilson et al. ........................... 475/204 |
| 5,704,863 | 1/1998 | Zalewski et al. ........................ 475/88 |
| 5,720,688 | 2/1998 | Wilson et al. ........................... 475/221 |

*Primary Examiner*—Dirk Wright
*Attorney, Agent, or Firm*—Harness, Dickey & Pierce, P.L.C.

[57] ABSTRACT

A transfer case is disclosed for a four-wheel drive vehicle. The transfer case includes an interaxle differential and a transfer clutch for controlling speed differentiation and torque biasing across the interaxle differential. A mode shift mechanism is provided for selectively coupling one or more components of the interaxle differential to the input shaft for establishing a full-time four-wheel drive mode, a locked four-wheel drive mode, and a Neutral mode. A controller controls actuation of the transfer clutch and the mode shift mechanism in response to a mode signal indicating which drive mode has been selected by the vehicle operation.

20 Claims, 17 Drawing Sheets

Fogelbert and U.S. Pat. No. 4,860,612 to Dick et al. wherein an electromagnetic biasing clutch is provided across the interaxle differential to controllably bias the torque delivered to the front and rear drivelines in response to wheel slip. While conventional part-time, on-demand and full-time transfer cases are satisfactory to perform their intended function, it is understood that a need exists to develop alternatives which incorporate the various advantages of each into a common transfer case.

FULL-TIME TRANSFER CASE WITH MODE SHIFT ARRANGEMENT

CROSS-REFERENCE

This application is a continuation-in-part of U.S. Ser. No. 08/410,910 filed Mar. 27, 1995 (now U.S. Pat. No. 5,655,618) which is a continuation of U.S. Ser. No. 08/230,122 filed Apr. 19, 1994 (now U.S. Pat. No. 5,400,866) which is a continuation-in-part of U.S. Ser. No. 08/028,952 filed Mar. 10, 1993 (now U.S. Pat. No. 5,323,871).

BACKGROUND OF THE INVENTION

The present invention relates to a power transfer system for controlling the distribution of drive torque between the front and rear wheels of a four-wheel drive vehicle as a function of various system and operator-initiated inputs.

In view of increased consumer popularity in four-wheel drive vehicles, a plethora of power transfer systems are currently being utilized in vehicular driveline applications for selectively directing power (i.e., drive torque) to the wheels of the vehicle. In many power transfer systems, a part-time transfer case is incorporated into the driveline and is normally operable in a two-wheel drive mode for delivering drive torque to the driven wheels. The part-time transfer case also includes a mode shift mechanism which can be selectively actuated by the vehicle operator for rigidly coupling the non-driven wheels to the driven wheels for establishing a part-time four-wheel drive mode. Alternatively, some power transfer systems automatically direct power to the non-driven wheels, without any input or action on the part of the vehicle operator, when traction is lost at the driven wheels. This "on-demand" feature is incorporated into the transfer case by replacing the mechanically-actuated mode shift mechanism with a clutch assembly that transfers drive torque to the non-driven wheels when a low traction condition occurs at the driven wheels. One example of an "on-demand" power transfer system is disclosed in U.S. Pat. No. 4,773,500 to Naito, et al wherein a hydraulically-actuated clutch assembly is operable for automatically controlling the amount of drive torque transferred to the non-driven wheels as a function of the wheel speed difference (i.e., the wheel slip) between the front and rear wheels.

As a further alternative, some vehicles are equipped with full-time transfer cases having a center (i.e., interaxle) differential for splitting the drive torque between the front and rear drivelines. To minimize loss of traction due to wheel slippage, most full-time transfer cases are also equipped with a slip limiting device for locking the interaxle differential to prevent excessive speed differentiation. Examples of manually-actuated differential lock-up arrangements are disclosed in commonly owned U.S. Pat. No. 3,848,691 to Dolan and U.S. Pat. No. 4,677,873 to Eastman. An automatic differential lock-up arrangement is disclosed in commonly owned U.S. Pat. No. 3,845,671 to Sharp et al. wherein an electrically-controlled clutch is actuated to lock-up the interaxle differential when speed differentiation due to a wheel slip condition is detected which exceeds a predetermined value. In addition, torque-biasing differential lock-up arrangements are disclosed in commonly owned U.S. Pat. No. 4,031,780 to Dolan et al. and U.S. Pat. No. 5,046,998 to Frost, which both utilize a viscous coupling to progressively modify the torque distribution in proportion to the magnitude of the speed differentiation across the interaxle differential. Finally, electronically-controlled full-time transfer cases are disclosed in U.S. Pat. No. 4,718,303 to

SUMMARY OF THE INVENTION

Accordingly, the present invention is directed to a transfer case which can be incorporated into the driveline of a four-wheel drive vehicle. The transfer case is equipped with an input shaft, a pair of output shafts, and a differential having an input, a first output coupled to one output shaft, and a second output coupled to the other output shaft. A mode shift mechanism is provided for permitting the input shaft to be selectively coupled to the input of the differential. The transfer case also includes a clutch assembly for varying the speed differentiation and torque biasing between the output shafts, and a control mechanism for controlling actuation of the mode shift mechanism and the clutch assembly.

The present invention is further directed to providing a mode shift mechanism which permits the vehicle operator to select between various available drive modes including a full-time 4WD mode, a Locked 4WD mode and a Neutral mode.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE INVENTION

Figure 1:
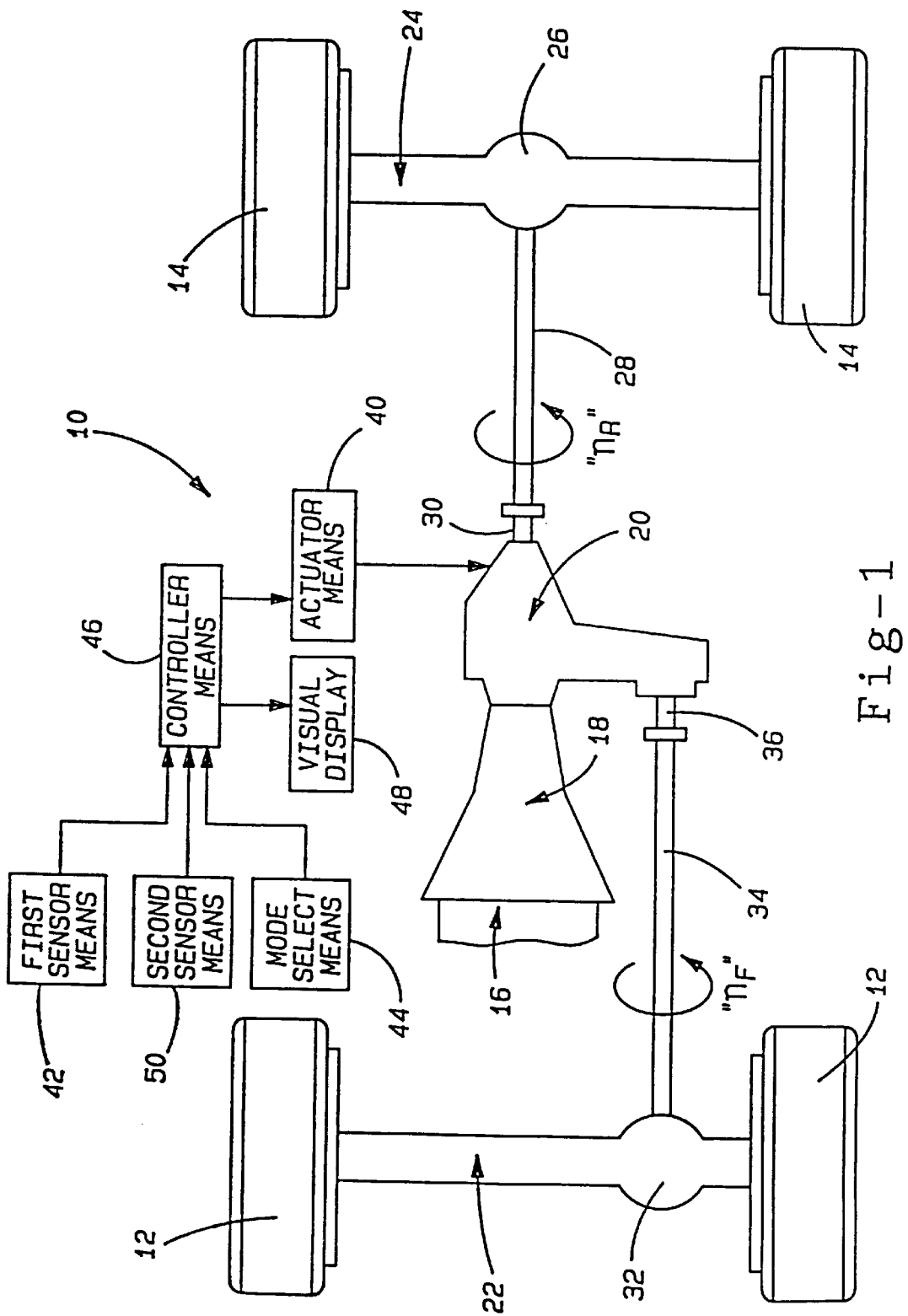
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10 which incorporates the novel principles of the present invention. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output member 30 of transfer case 20. Similarly, front axle assembly 22 includes a front differential 32 that is coupled to one end of a front drive shaft 34, the opposite end of which is coupled to a second output member 36 of transfer case 20. It is to be understood that the specific orientation of the drivetrain is merely exemplary in nature and that the drivetrain could be reversed for normally driving front wheels 12.

Transfer case 20 is equipped with an electronically-controlled torque transfer arrangement for delivering drive torque to front wheels 12 (i.e., the non-driven wheels) for establishing a four-wheel drive mode of operation. More specifically, the torque transfer arrangement includes a transfer clutch 38 that is operable for transferring drive torque from first output member 30 to second output member 36, thereby delivering drive torque to front wheels 12. Power transfer system 10 further comprises an actuator 40 for actuating transfer clutch 38, a first sensor group 42 for sensing specific dynamic and operational characteristics of the motor vehicle and generating sensor input signals indicative thereof, and a controller 46 for generating a control signal in response to the sensor input signals. Moreover, controller 46 is adapted to control the amount of drive torque transferred through transfer clutch 38 to second output member 36 by sending the control signal to actuator 40. As is schematically shown, controller 46 is also operable for illuminating a visual display 48, located within the passenger compartment, for providing the vehicle operator with a visual indication of the operational status of power transfer system 10. As an additional feature, actuator 40 may be provided with mode locking mechanism for maintaining power transfer system 10 in the selected drive mode upon the interruption of power.

Power transfer system 10 can include a second sensor group 50 for generating "operator-initiated" input signals that are indicative of the position of one or more movable control elements under the control of the vehicle operator. The operator-initiated input signals are used for establishing control characteristics which, in conjunction with the sensor input signals, further regulate the torque distribution during "on-demand" operation. As a further option, power transfer system 10 can be equipped with a mode select mechanism 44 for permitting the vehicle operator to select one of a two-wheel drive mode, a part-time four-wheel drive mode and an "on-demand" drive mode. In a system equipped with mode select mechanism 44, actuator 40 is operable for actuating transfer clutch 38 in response to a mode signal generated by the vehicle operator. When the two-wheel drive mode is selected, all drive torque is delivered from first output member 30 to rear wheels 14 and transfer clutch 38 is maintained in a "non-actuated" condition. When the part-time four-wheel drive mode is selected, transfer clutch 38 is fully actuated and maintained in a "lockup" condition such that second output member 36 is, in effect, rigidly coupled for driven rotation with first output member 30. As such, the torque distribution between front wheels 12 and rear wheels 14 is dictated by the specific tractive forces generated at each wheel set. When the "on-demand" drive mode is selected, controller 46 controls the degree of actuation of actuator 40 for varying the amount of drive torque directed to front wheels 12 through transfer clutch 38 as a function of the sensor input signals for providing enhanced traction when needed. In addition, the ability to controllably modulate the actuated condition of transfer clutch 38 also provides for superior handling and steering control by substantially minimizing the oversteer and understeer tendencies of the vehicle during a cornering maneuver, such tendencies known to be commonly associated with two-wheel drive operation and part-time four-wheel drive operation, respectively. Other advantages associated with controllably modulating the actuated state of transfer clutch 38 will be detailed hereinafter.

Figure 2:
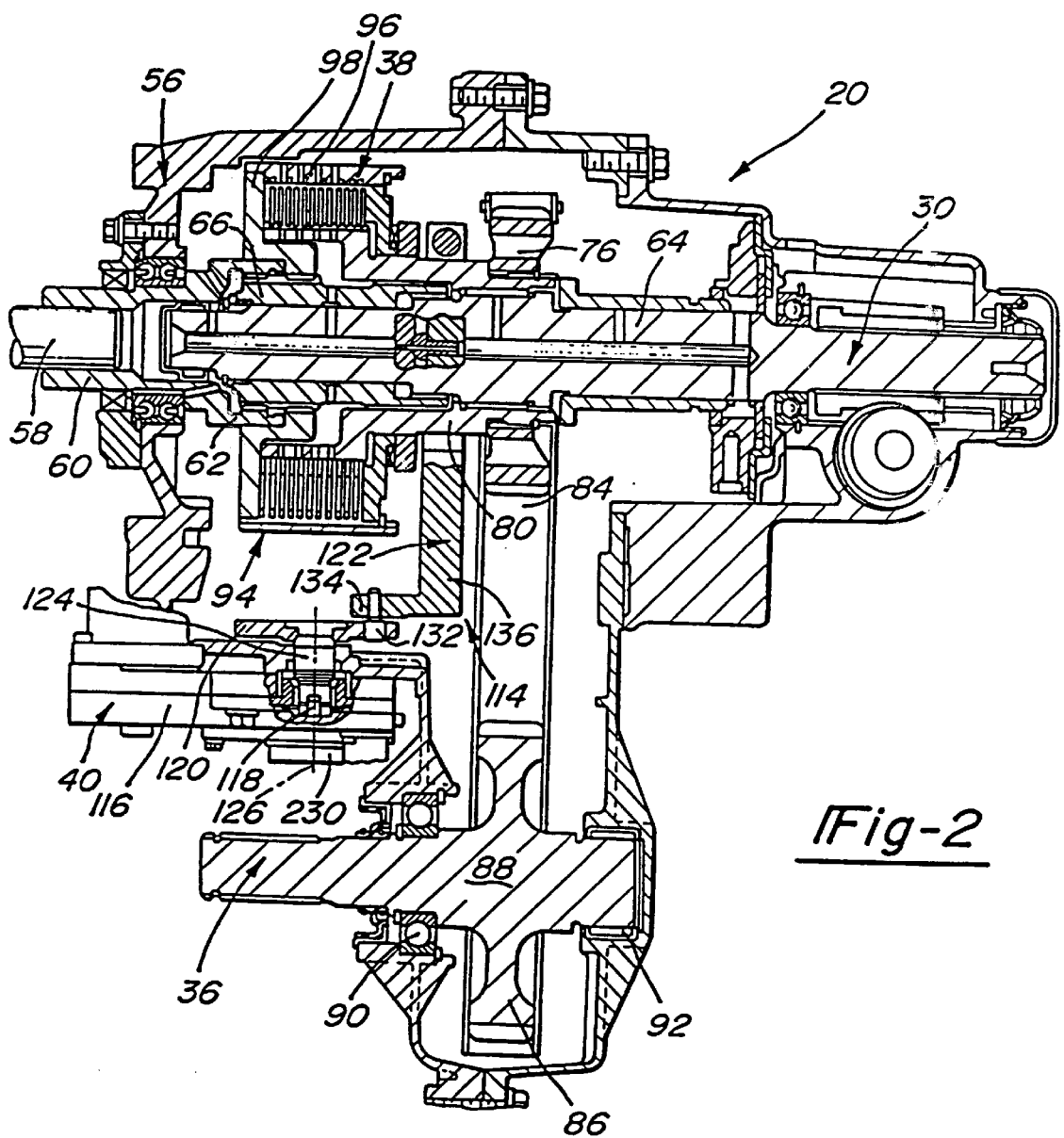
FIG. 2 is a cross-sectional view of a transfer case constructed according to a first embodiment of the power transfer system and which includes a clutch assembly, a drive mechanism, and an electronically-controlled rotary actuator.
Figure 3:
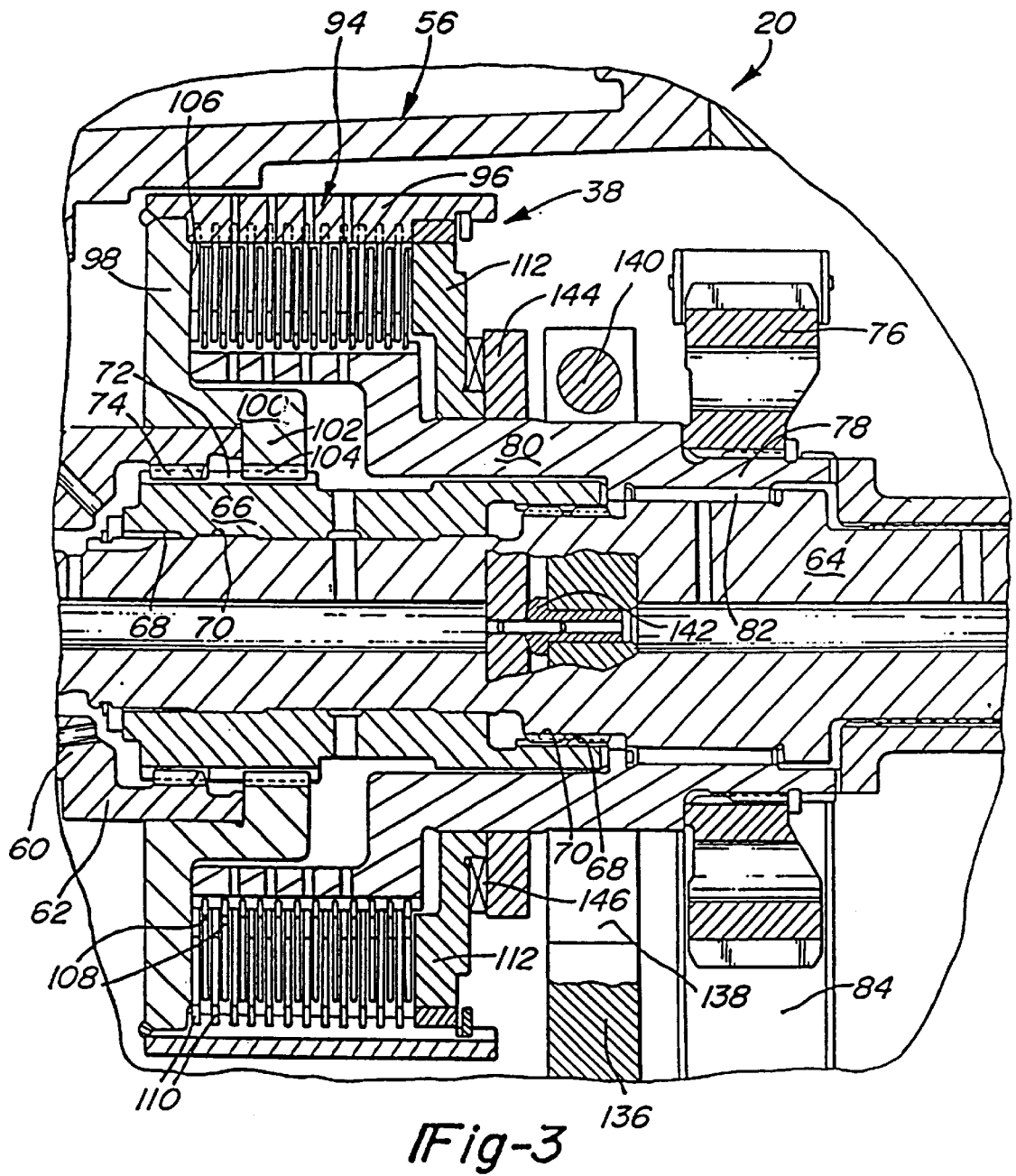
FIG. 3 is an enlarged partial view of FIG. 2 showing the various components in greater detail.

With particular reference to FIGS. 2 and 3, a preferred construction for transfer case 20 will now be described. Transfer case 20 is shown to include a housing 56 formed by a series of modular sections that are suitably interconnected in a conventional manner. A transmission output shaft 58 couples transmission 18 to an input shaft 60 of transfer case 20 for supplying power thereto. Input shaft 60 has an annular input gear 62 formed integral therewith. In the embodiment shown, first output member 30 is an elongated mainshaft 64 which is aligned on the longitudinal axis of input shaft 60 and is supported for rotation within housing 56. An intermediate sleeve 66 is concentrically supported on a forward end portion of mainshaft 64 and is fixed for rotation therewith by means of one or more sets of sleeve internal splines 68 engaged with corresponding sets of external splines 70 formed on mainshaft 64. In addition, intermediate sleeve 66 is formed with external splines 72 that are shown to be engaged with internal splines 74 formed on input gear 62. As such, drive torque is transferred without reduction from input shaft 60 to mainshaft 64 via intermediate sleeve 66. While transfer case 20 is shown to utilize a separate intermediate sleeve 66, it is contemplated that sleeve 66 could be integrated into mainshaft 64 such that mainshaft 64 would be coupled directly to input shaft 60.

With continued reference to FIGS. 2 and 3, means are shown for transferring drive torque from mainshaft 64 to front wheels 12 through transfer clutch 38. More specifically, a drive sprocket 76 is shown fixed (i.e., splined) for rotation on a tubular extension 78 of a rotatable clutch hub 80 that is associated with transfer clutch 38. Extension 78 is shown rotatably supported on mainshaft 64 by one or more suitable bearing assemblies 82. Drive sprocket 76 drivingly engages a chain 84 which is coupled to a lower driven sprocket 86. Driven sprocket 86 is coupled to, or an integral portion of, second output member 36 of transfer case 20. Second output member 36 is shown as a front output shaft 88 which is supported for rotation within housing 56 by suitable bearing assemblies 90 and 92. As noted, front output shaft 88 is operably connected to the motor vehicle's front wheel 12 via front drive shaft 34.

Transfer clutch 38 is shown operably installed within transfer case 20 for selectively transferring drive torque from intermediate sleeve 66 to front output shaft 88. Preferably, transfer clutch 38 is a mechanically-actuated multi-plate clutch assembly that is arranged to concentrically surround a portion of mainshaft 64 and intermediate sleeve 66. As noted, clutch hub 80 is fixedly secured to drive sprocket 76 so as to drive, or be driven by, front output shaft 88 of transfer case 20. In a preferred form, transfer clutch 38 also includes a rotatable drum assembly 94 concentrically surrounding clutch hub 80 and is fixed (i.e., splined) to intermediate shaft 66 for rotation therewith. Drum assembly 94 has an outer cylindrical drum 96 which is enclosed at one end by a cover plate 98. As seen, cover plate 98 has a cup-shaped annular portion 100 surrounding the aft end of input gear 62 and which forms an inward radial flange 102 having internal spines 104 meshed with external splines 72 of intermediate sleeve 66. Accordingly, drum assembly 94 is coupled for rotation with intermediate sleeve 66 and mainshaft 64. Thus, drum assembly 94 and clutch hub 80 are capable of rotating relative to one another and form an internal chamber 106 therebetween. Disposed within internal chamber 106 are two sets of alternately interleaved friction clutch plates that are operable for transferring torque from input shaft 60 through intermediate sleeve 66 and drum assembly 94 to clutch hub 80 and, ultimately, to front output shaft 88 in response to a clutch "engagement" force applied thereto. One set of clutch plates, referred to as inner clutch plates 108, are mounted (i.e., splined) for rotation with clutch hub 80 while the second set of clutch plates, referred to as outer clutch plates 110, are mounted (i.e. splined) to outer drum 96 for rotation with drum assembly 94. In addition, a reaction plate 112 is mounted on the aft end of outer drum 96 for enclosing the interleaved clutch plates within chamber 106. Reaction plate 112 is rotatable with drum assembly 94 and yet is axially movable with respect to interleaved friction clutch plates 108 and 110. Thus, reaction plate 112 acts as a pressure plate for compressing the interleaved clutch plates so as to cause drive torque to be transferred through transfer clutch 38 as a function of the clutch engagement force exerted thereon by actuator 40. In the embodiment shown, reaction plate 112 is supported for limited axial movement around the outer peripheral surface of an intermediate portion of clutch hub 80.

To provide means for selectively controlling the magnitude of the clutch engagement force exerted on reaction plate 112, actuator 40 is associated with a mechanical drive mechanism 114 and includes an electrically-controlled rotary actuator 116. Preferably, rotary actuator 116 is an electric gearmotor which is operable for generating an output torque, the value of which varies as a function of the magnitude of the electrical control signal applied thereto by controller 46. In general, drive mechanism 114 is interconnected to a rotary output member 118 of rotary actuator 116 for changing the output torque into an axially-directed force for controlling the clutch engagement force applied to reaction plate 112 of transfer clutch 38. As best seen from FIGS. 3 and 4, drive mechanism 114 includes a sector plate 120 that is rotatably driven through a limited range of angular motion by output member 118 of rotary actuator 116 and a lever arm assembly 122. Sector plate 120 is interconnected to lever arm assembly 122 which is adapted to exert the clutch engagement force on reaction plate 112 in response to controlled rotation of sector plate 120. A rotatable actuating shaft 124 is supported from transfer case housing 56 for rotation about an axis 126. A first end of actuating shaft 124 is secured in an aperture 128 formed in sector plate 120, with its opposite end coupled to output member 118 of rotary actuator 116. Thus, actuating shaft 124 and sector plate 120 are rotated about axis 126 in response to rotation of output member 118 upon actuation of rotary actuator 116.

To control the magnitude of the clutch engagement force exerted on reaction plate 112, sector plate 120 includes a contoured mode slot 130 into which a crowned roller 132 extends. Crowned roller 132 is fixed to a flange section 134 of a lever member 136 associated with lever arm assembly 122. Lever member 136 also includes a generally Y-shaped or forked section 138 which is bifurcated to surround mainshaft 64 and clutch hub 80. The bifurcated ends of forked section 138 are retained for pivotal movement on a transverse rail 140, the ends of which are retained in suitable sockets (not shown) formed in housing 56. In general, the contour of mode slot 130 is configured to cause pivotable movement of lever member 136 in response to rotation of sector plate 120 for controlling the clutch engagement force exerted on reaction plate 112 of transfer clutch 38. Moreover, a plurality of circumferentially-spaced buttons 142 are secured to a front surface of forked section 138 and are adapted to apply the clutch engagement force to reaction plate 112 for compressing interleaved clutch plates 108 and 110 via a suitable thrust mechanism. Preferably, the thrust mechanism includes an annular apply plate 144 that is journally supported on clutch hub 80 and positioned intermediate reaction plate 112 and lever member 136, and a thrust bearing/washer arrangement 146 interposed between apply plate 144 and reaction plate 112 for allowing rotation of reaction plate 112 with respect to apply plate 144.

Figure 4:
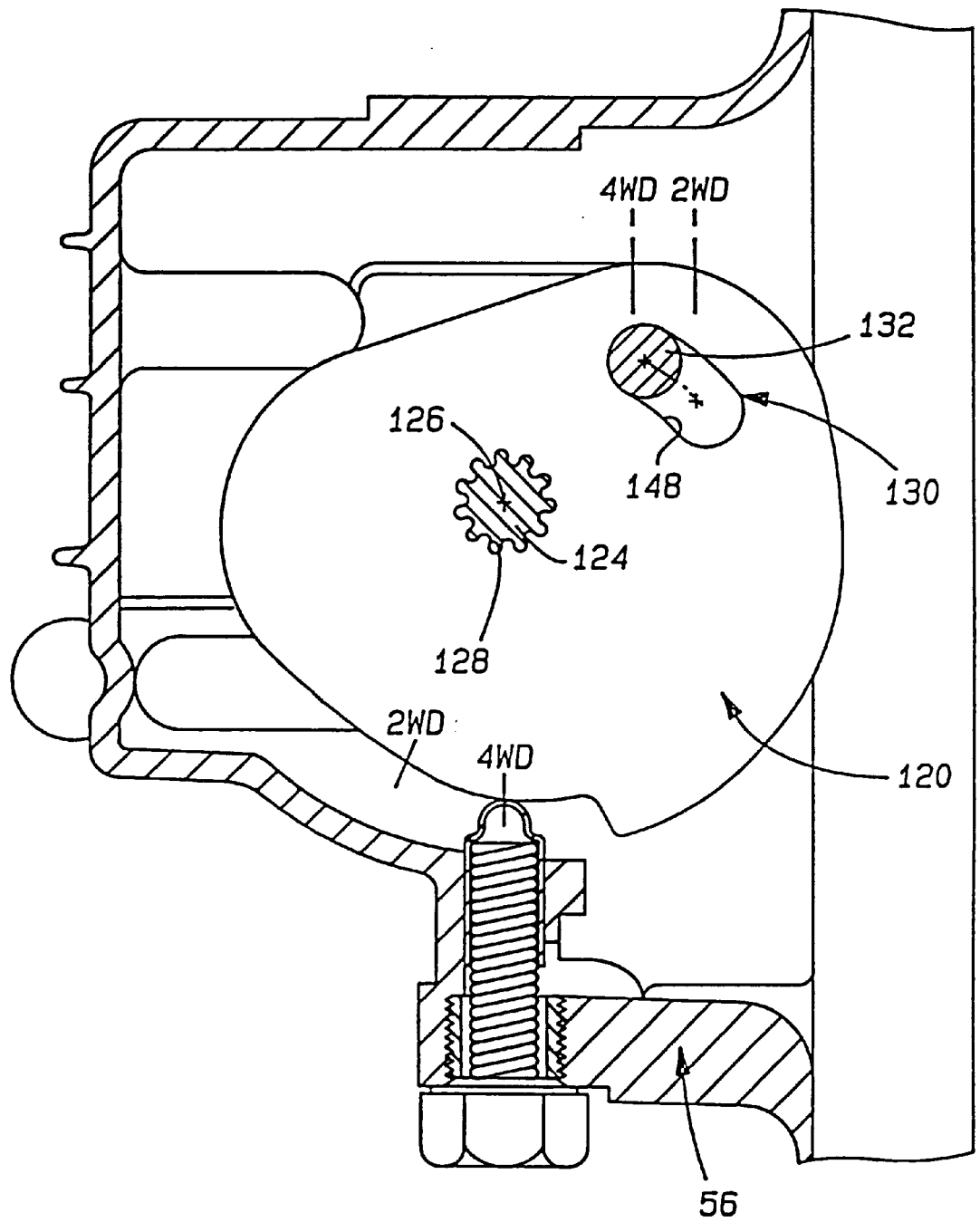
FIG. 4 is a side view of a sector plate associated with the drive mechanism of FIGS. 2 and 3.

With particular reference to FIG. 4, means are provided for coordinating the pivotal movement of lever arm assembly 122 upon rotation of sector plate 120 between the two distinct sector positions, as labelled "4WD" and "2WD". In general, the contour of mode slot 130 is defined by a cam pathway 148. In the 4WD sector position shown, crowned roller 132 is positioned within mode slot 130 in close proximity to the terminal end of cam pathway 148 for establishing a four-wheel drive (4WD) position. With crowned roller 132 in the four-wheel drive (4WD) position, lever arm assembly 122 exerts a maximum clutch engagement force on reaction plate 112 such that transfer clutch 38 is considered to be operating in a fully "actuated" condition. In this fully actuated condition, mainshaft 64 is effectively coupled to front output 88 due to the maximum torque delivered through transfer clutch 38.

As sector plate 120 is caused to rotate about axis 126 in a first direction (i.e., counterclockwise) from the position shown, the contour of cam pathway 148 causes axial displacement of crowned roller 132 toward a two-wheel drive (2WD) position. Such movement of crowned roller 132 causes concurrent pivotable movement of lever arm assembly 122 which results in a proportional decrease in the clutch engagement force that is being exerted on reaction plate 112. Moreover, once crowned roller 132 is in the two-wheel drive (2WD) position, lever arm assembly 122 does not exert an engagement force on reaction plate 112 which is sufficient to transfer drive torque through transfer clutch 38 to clutch hub 80, whereby transfer clutch 38 is considered to be in a "non-actuated" condition. As will be appreciated, rotation of sector plate 120 in the opposite direction (i.e., clockwise) from the 2WD sector position toward the 4WD sector position results in movement of crowned roller 132 toward the four-wheel drive (4WD) position, whereby lever arm assembly 122 is pivoted about rail 140 for proportionally increasing the clutch engagement force exerted on reaction plate 112.

According to the embodiment disclosed, rotary actuator 116 is actuated in accordance with specific predefined relationships that are established in response to the current value of the sensor input signals for rotatably driving sector plate 120 to any position between the 2WD and 4WD sector positions. Thus, the amount of torque transferred "on-demand" through transfer clutch 38 is proportional to the clutch engagement force, the value of which is determined by the particular position of crowned roller 132 between the two-wheel drive (2WD) position and the four-wheel drive (4WD) position that is established upon controlled rotation of sector plate 120.

In its most basic sense, power transfer system 10 automatically and instantaneously transfers drive torque "on-demand" to front wheels 12 during the occurrence of slippage of rear wheel 14 that are typically associated with low tractive road conditions. In addition, power transfer system 10 functions to continuously monitor and regulate the "on-demand" operation in a manner that is independent of any deliberate action by the vehicle operator. Accordingly, the modulation range is established between the limits of bi-directional sector rotation as defined by movement of crowned roller 132 within cam pathway 148 between the (2WD) and (4WD) positions. Moreover, the magnitude of the clutch engagement force generated by lever arm assembly 122 and applied to transfer clutch 38 is proportional to the magnitude of the output torque generated by rotary actuator 116 which, in turn, is proportional to the magnitude of the control signal (i.e., percentage duty cycle) applied by controller means 46 to rotary actuator 116. Thus, the amount of drive torque transferred through transfer clutch 38 to front output shaft 88 is also proportional to the magnitude of the control signal. As such, the distribution ratio of drive torque between front output shaft 88 and mainshaft 64 of transfer case 20 may be selectively varied as a function of changes in the magnitude of the control signal for optimizing the tractive performance characteristics.

Figure 5:
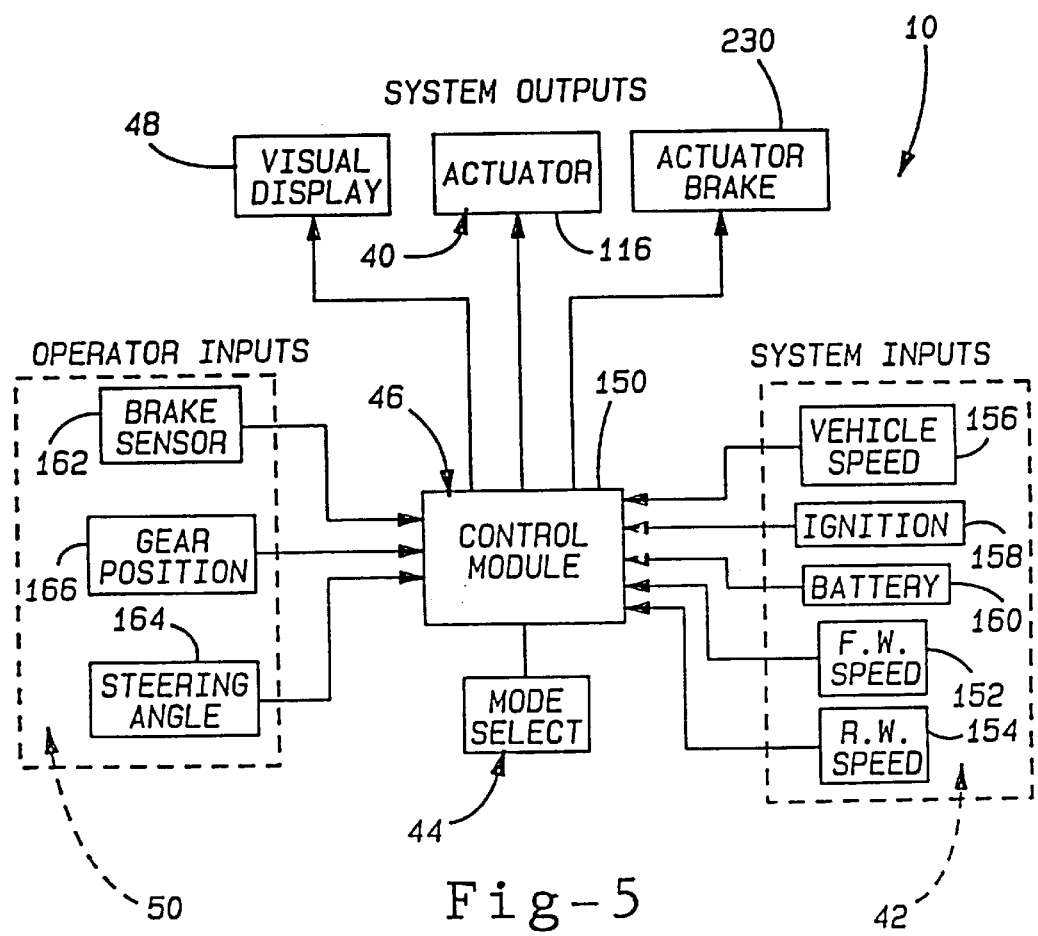
FIG. 5 is a block diagram of the control system for the power transfer system of the present invention.

With particular reference now to FIG. 5, a block diagram of a control system associated with power transfer system 10 is shown. Preferably, controller 46 is an electronic control module 150 having signal processing and information storage capabilities. In addition, first sensor group 42 is shown as a group of various "system" sensors that are provided for detecting and signaling specific dynamic and operational characteristics of the motor vehicle. The input signals generated by the "systems" sensor group are delivered to electronic control module 150. Preferably, these sensors include a front speed sensor 152 for sensing the rotational speed ($n_F$) of front drive shaft 34, a rear speed sensor 154 for sensing the rotational speed ($n_R$) of rear drive shaft 28, a vehicle speed sensor 156 for sensing a vehicle speed (V), an ignition switch 158 for signalling the operational status of the vehicle, and a battery input 160 for powering electronic control module 150. In vehicles equipped with an anti-lock brake system (ABS), the original equipment ABS sensors provided at each wheel can be used for determining an "average" front drive shaft speed and rear drive shaft speed. Alternatively, front and rear speed sensors 152 and 154, respectively, can be arranged for directly measuring the speed of front output shaft 88 and mainshaft 64, respectively. Moreover, it is possible for vehicle speed sensor 156 to be eliminated with the vehicle speed signal (V) being computed from the front rotational speed signal ($n_F$) generated by front speed sensor 152. However, it is to be understood that any suitable speed sensing arrangement capable of generating a signal indicative of the rotational speed of a shaft is fairly within the scope of the present invention.

The control system also illustrates the use of various "operator-initiated" inputs, as generally categorized by second sensor group 50. These inputs include a brake sensor 162 for sensing when the vehicle operator is applying the brakes, a steering angle sensor 164 for detecting the magnitude of a steering angle ($\phi$), and an accelerator sensor for sensing an accelerating condition of the vehicle. Preferably, the accelerator sensor is a throttle position sensor 166 for sensing the degree of opening of a throttle valve associated with engine 16 or for sensing the degree of depression of an accelerator pedal, and is operable to produce a throttle position signal (A). The operator-initiated input signals are delivered to control module 150 where they are used, in conjunction with the system input signals, to further control "on-demand" operation.

Figure 6:
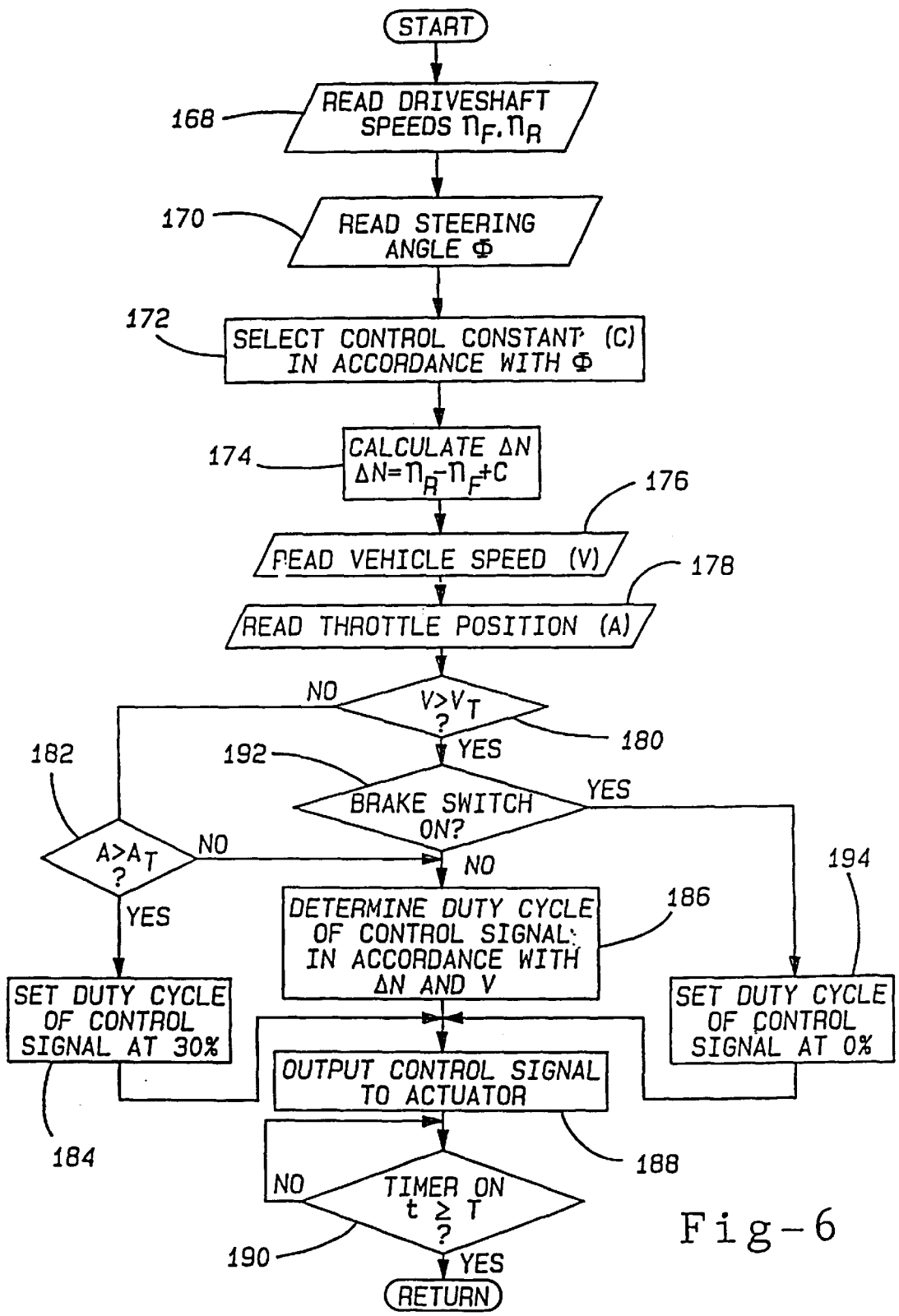
FIG. 6 is a flow chart depicting a control sequence for the operations performed by the control system of FIG. 5.
Figure 8:
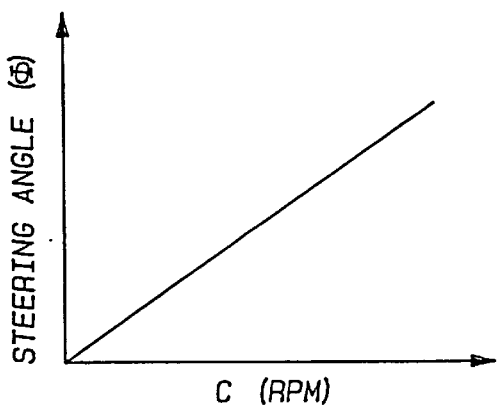
FIG. 8 is an exemplary plot of a relationship between steering angle and a control characteristic used for modifying the speed differential signal.

With reference now to FIG. 6, a control sequence for automatically controlling the "on-demand" operation of power transfer system 10 is shown. In general, the flow chart represents a sequence of the operations performed by electronic control module 150 and which are diagrammatically shown in block form. More specifically, the flow chart illustrates a succession of control steps that are continuously repeated for calculating the value of the control signal to be applied to rotary actuator 116 in accordance with various predefined relationships between the current value of a front and rear wheel speed differential ($\Delta N$) and vehicle speed (V), as modified by the steering angle ($\phi$) and other operator-initiated inputs. Block 168 is representative of the control step in which the current value of the rotational speed of front drive shaft 34 ($n_F$) and rear drive shaft 28 ($n_R$) are read. Block 170 indicates the step of reading the value of steering angle ($\phi$) as detected by steering angle sensor 164. Block 172 represents the operation of selecting a control characteristic (C) in accordance with the steering angle ($\phi$). FIG. 8 illustrates a plot of an exemplary relationship, which may be stored as a look-up table or computed from an arithmetic equation in control module 150, which correlates the control characteristic (C) as a function, preferably a linear function, of the detected steering angle ($\phi$). Next, block 174 represents the step of calculating a speed differential ($\Delta N$) according to the equation $\Delta N = n_R - n_F + C$ Blocks 176 and 178 indicate the steps of reading the current value of the vehicle speed (V) as detected by vehicle speed sensor 156 and the throttle position (A) as detected by throttle position sensor 166, respectively. As shown in block 180, control module 150 determines whether the vehicle speed (V) exceeds a predefined threshold value ($V_T$) such as, for example, 5 mph. If the vehicle speed is less than the threshold value ($V_T$), a second determination is made (block 182) as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electrical control signal is set as a preset value, such as 30% duty cycle, as indicated by block 184. In this manner, power transfer system 10 is adapted to transfer torque to front wheels 12 in response to acceleration at low vehicle speeds to inhibit wheel slip. However, if the value of the throttle position (A) is less than its threshold value ($A_T$), then the magnitude of the duty cycle for the control signal is set in accordance with predefined relationships between the speed differential signal ($\Delta N$) and vehicle speed (V), as indicated by block 186. Block 188 represents the step of outputting the electrical control signal to rotary actuator 116 for developing the desired amount of torque transfer, if any, across transfer clutch 38. As shown in block 190, a timer circuit within control module 150 is actuated simultaneously with energization of actuator 116 for maintaining such energization for a predetermined time period (T). Once the period of energization (t) equals the predetermined time period (T) (or t≧T), control module 150 repeats the control routine.

To enhance steering control, block 192 is indicative of the control step between steps 180 and 186 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 162) during an occurrence of a low traction road condition and the vehicle speed (V) is greater than the predefined threshold ($V_T$), then control module 150 sets the magnitude of the control signal sent to rotary actuator 116 to zero (block 194) for de-actuating transfer clutch 38 and disabling the "on-demand" feature. This control sequence prevents simultaneous braking and "on-demand" four-wheel operation for providing the vehicle operator with greater steering and braking control. However, during the occurrence of a low traction condition when brake sensor 162 signals control module 150 that the vehicle operator is not applying the brakes, electronic control module 150 automatically energizes rotary actuator 116 (block 188) for actuating transfer clutch 38 in accordance with the relationships generally denoted by block 186.

Figure 7:
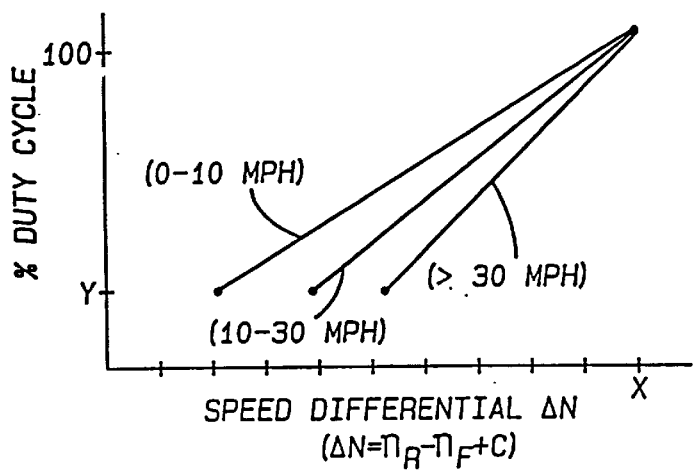
FIG. 7 illustrates exemplary plots of relationships between wheel speed differential signals at various vehicle speed ranges and the electrical control signal supplied by the control system to the rotary actuator for controlling the amount of torque transferred through the clutch assembly.

With particular reference to FIG. 7, a set of exemplary plots used for establishing the magnitude of the duty cycle to be sent to rotary actuator 116 in response to the current value of the speed differential ($\Delta N$) and vehicle speed (V) during "on-demand" operation, as diagrammatically referred to by block 186 in FIG. 6, will now be detailed. As seen, power transfer system 10 linearly correlates the percentage duty cycle of the control signal applied to rotary actuator 116 to a range of speed differential ($\Delta N$) values. In general, the percentage duty cycle for the control signal increases linearly from a minimum actuation value (Y%) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no drive torque is transmitted through transfer clutch 38 to front output shaft 88. However, when the value of the speed differential ($\Delta N$) exceeds the minimum differential limit, "on-demand" four-wheel drive operation is established by supplying a control signal to rotary actuator 116 having a duty cycle value greater than (Y%). Thus, the minimum actuation duty cycle (Y%) for the control signal correlates to the point at which frictional engagement between interleaved clutch plates 108 and 110 results in the delivery of a portion of the total drive torque to front output shaft 88 of transfer case 20 for initiating "on-demand" four-wheel drive operation.

Figure 9:
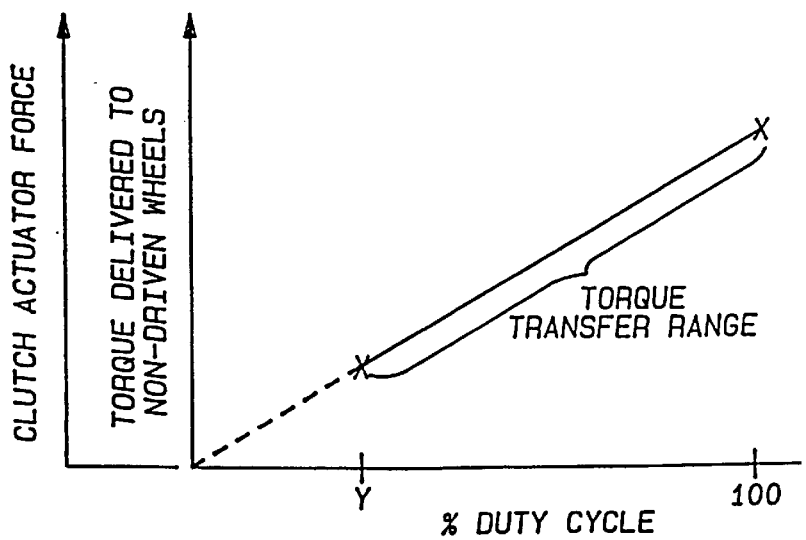
FIG. 9 graphically illustrates the relationship of the electrical control signal with respect to the output force generated by the drive mechanism and the corresponding drive torque transferred through the clutch assembly to the non-driven wheels.

The portion of the total drive torque transferred through transfer clutch 38 to front output shaft 88 increases substantially linearly as the magnitude of the duty cycle for the control signal increases from the minimum actuation value (Y%) to the maximum actuation value (100%). Preferably, the maximum value (X) of the speed differential ($\Delta N$) correlates to the maximum actuation duty cycle (100%) at which point the maximum clutch engagement force is generated for completely locking-up clutch plates 108 and 110. During "on-demand" four-wheel drive operation, a reduction in the magnitude of the control signal sent to rotary actuator 116 will result in actuator output member 118 being back-driven due to the clutch engagement load exerted by lever arm assembly 122 on sector plate 120. As such, a zero control signal will back-drive sector plate 120 until crowned roller 132 is in the two-wheel drive (2WD) position. Alternatively, the direction of driven rotation of actuator output member 118 may be reversed until the desired clutch engagement force is established. As best seen from FIG. 9, an exemplary linear relationship between the magnitude of the duty cycle supplied to rotary actuator 116 and the clutch engagement force generated and, in turn, the amount of torque delivered across transfer clutch 38 is shown.

In accordance with an alternative embodiment of the present invention, power transfer system 10 is also equipped with mode select mechanism 44 for establishing at least three distinct operational modes, namely a two-wheel drive mode, a part-time four-wheel drive mode, and an "on-demand" drive mode. In operation, the vehicle operator selects the desired mode via mode select mechanism 44 which, in turn, signals controller 46 of the selection. Thereafter, controller 46 generates an electrical control signal that is applied to rotary actuator 116 for controlling the rotated position of sector plate 120. To provide means for the vehicle operator to shift power transfer system 10 into one of the available operational modes, mode select mechanism 44 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality of positions corresponding to the available operational modes which, in conjunction with a suitable electrical switch arrangement, generates a mode signal indicating the mode selected. In either form, mode select mechanism 44 offers the vehicle operator the option of deliberately choosing between the part-time and on-demand operative drive modes.

Figure 10:
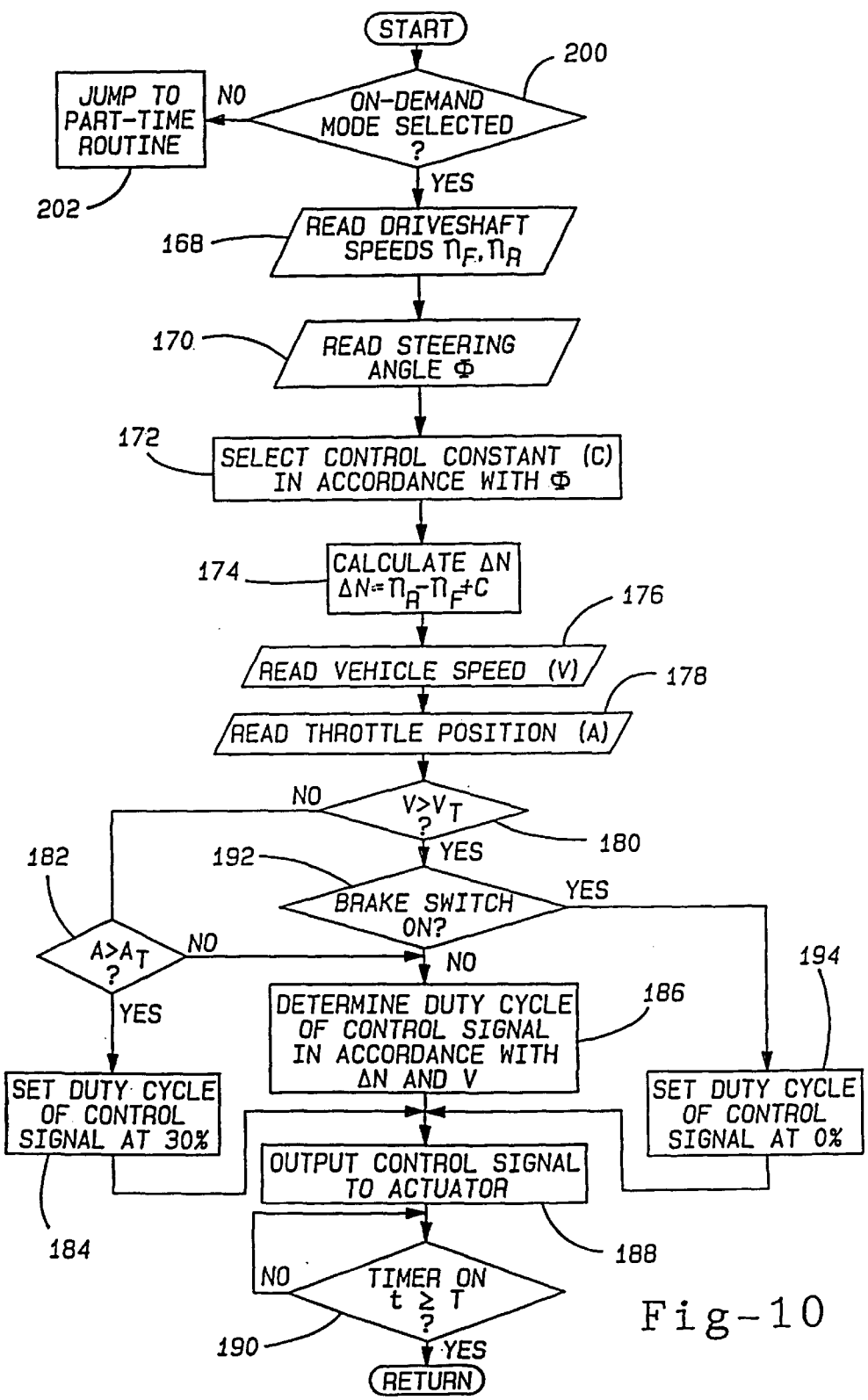
FIG. 10 is a flow chart, similar to the flow chart of FIG. 6, depicting the control sequence for a power transfer system equipped with mode selection capabilities.

With reference now to FIG. 10, a control sequence for the selection and the subsequent automatic control of the "on-demand" drive mode is shown. In general, the flow chart is identical to that shown in FIG. 6 with the addition of control steps for integrating mode select mechanism 44 into the control system. When mode select mechanism 44 signals selection of the "on-demand" mode, as indicated by block 200, a succession of control steps are continuously repeated for selecting the value of the control signal to be applied to rotary actuator 116 in accordance with the above-noted predefined relationships between the current value of a front and rear wheel speed differential ($\Delta N$) and vehicle speed (V), as modified by the steering angle ($\phi$) and other operator-initiated inputs. However, if any other mode is selected, then the control sequence jumps to a part-time routine, as indicated by block 202. When the vehicle operator selects an operational mode via mode select mechanism 44 other than the "on-demand" drive mode, control module 150 controls the energized condition of rotary actuator 116 for rotating sector plate 120 into one of the 2WD or 4WD sector positions which corresponds to the two-wheel drive mode or part-time four-wheel drive mode, respectively. More particularly, if the two-wheel drive mode is selected, control module 150 sends an electrical control signal to rotary actuator 116 for rotating sector plate 120 in the first direction to the 2WD sector position for causing movement of crowned roller 132 to its two-wheel drive (2WD) position. If the part-time four-wheel drive mode is selected, then rotary actuator 116 is fully actuated to rotate sector plate 120 in the opposite direction to the 4WD sector position for moving crowned roller 132 to its four-wheel drive (4WD) position.

Figure 11:
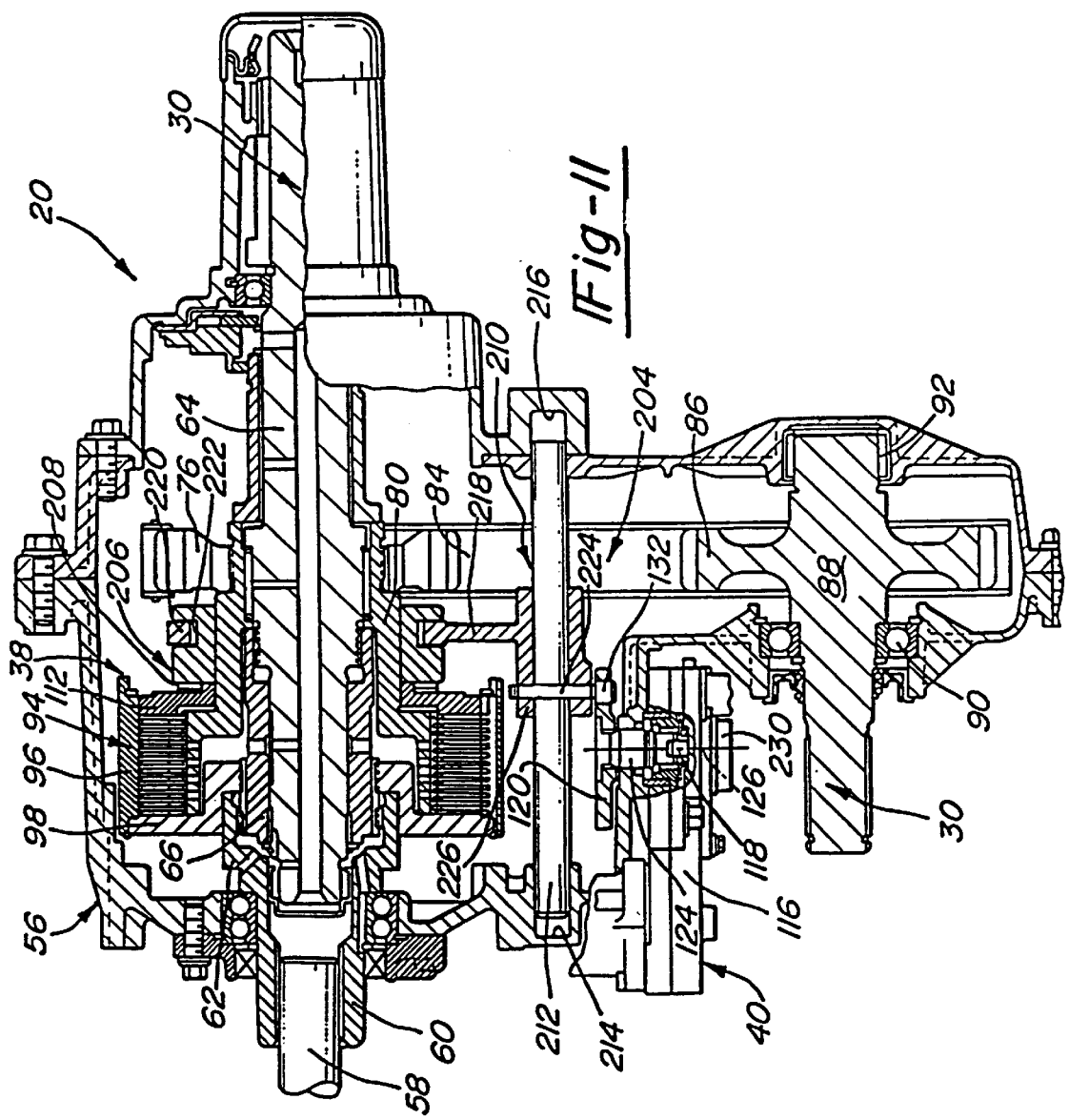
FIG. 11 is a sectional view of a transfer case constructed according to an alternative embodiment and having a modified drive mechanism incorporated therein.

With reference now to FIG. 11, an alternative construction for a drive mechanism 204 is shown which is generally applicable to replace lever arm assembly 122 of drive mechanism 114. As such, like numbers are used to identify those components previously described. In general, drive mechanism 204 includes sector plate 120 (FIG. 4) and an axially movable mode sleeve 206 which is journally supported for limited axial sliding movement on clutch hub 80 and positioned intermediate reaction plate 112 and drive sprocket 76. In addition, mode sleeve 206 has a front face surface 208 which is adapted to apply the clutch engagement force to reaction plate 112. A fork assembly 210 couples mode sleeve 206 to sector plate 120 for changing the output torque of rotary output member 118 into an axially-directed force for controlling the clutch engagement force exerted by face surface 208 on reaction plate 112.

Shift fork assembly 210 includes a shift rail 212 retained for sliding movement in sockets 214 and 216 formed in housing 56, and a shift fork 218 fixed to shift rail 212 and having a bifurcated fork portion 220 retained within an annular groove 222 in mode sleeve 206. Crowned roller 132 is fixed, via pin 224 to a tubular portion 226 of shift fork 218 for coupling shift fork 218 for axial sliding movement with rail 212. As before, crowned roller 132 extends into contoured mode slot 130 formed in sector plate 120, wherein the contour of mode slot 130 is configured to cause axial movement of shift fork assembly 210 and mode sleeve 206 in response to rotation of sector plate 120 for controlling the clutch engagement force exerted on reaction plate 112 of transfer clutch 38. In the 4WD sector position, crowned roller 132 is positioned within mode slot 130 in close proximity to the terminal end of cam pathway 148 for again establishing the four-wheel drive (4WD) position. With crowned roller 132 in the four-wheel drive (4WD) position, face surface 208 of mode sleeve 206 exerts a maximum clutch engagement force on reaction plate 112 such that transfer clutch 38 is considered to be operating in a fully actuated condition. As sector plate 120 is caused to rotate about axis 126 in the first direction from the 4WD sector position, the contour of cam pathway 148 causes axial displacement of crowned roller 132 toward the two-wheel drive (2WD) position. Such movement of crowned roller 132 causes concurrent axial movement of fork assembly 210 and mode sleeve 206 which results in a proportional decrease in the clutch engagement force that is being exerted on reaction plate 112. Thus, the amount of torque transferred through transfer clutch 38 is proportional to the clutch engagement force, the value of which is determined by the particular position of crowned roller 132 between the two-wheel drive (2WD) position and the four-wheel drive (4WD) position that is established upon controlled rotation of sector plate 120.

Figure 12:
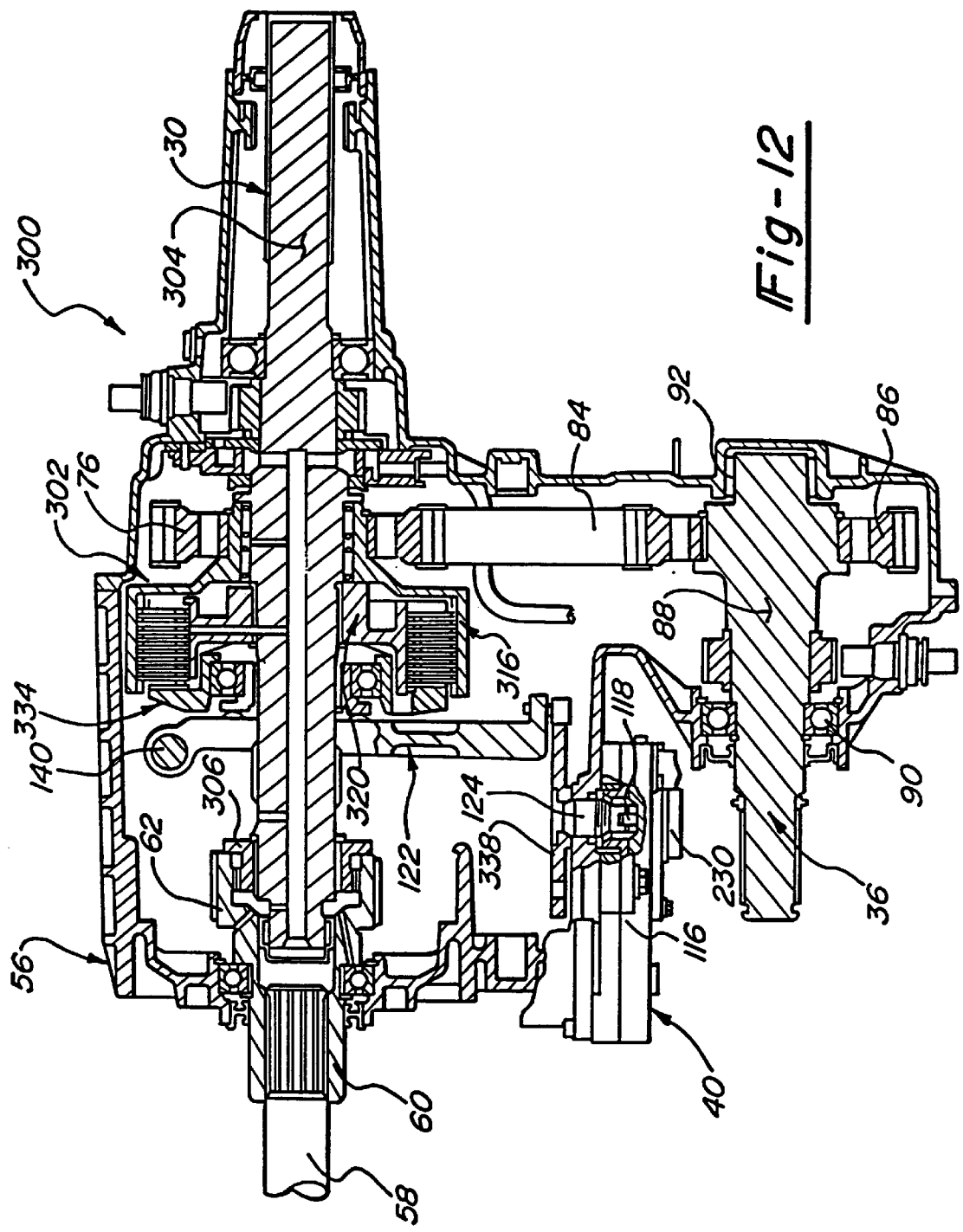
FIG. 12 is a sectional view of a transfer case constructed in accordance with another alternative embodiment.
Figure 13:
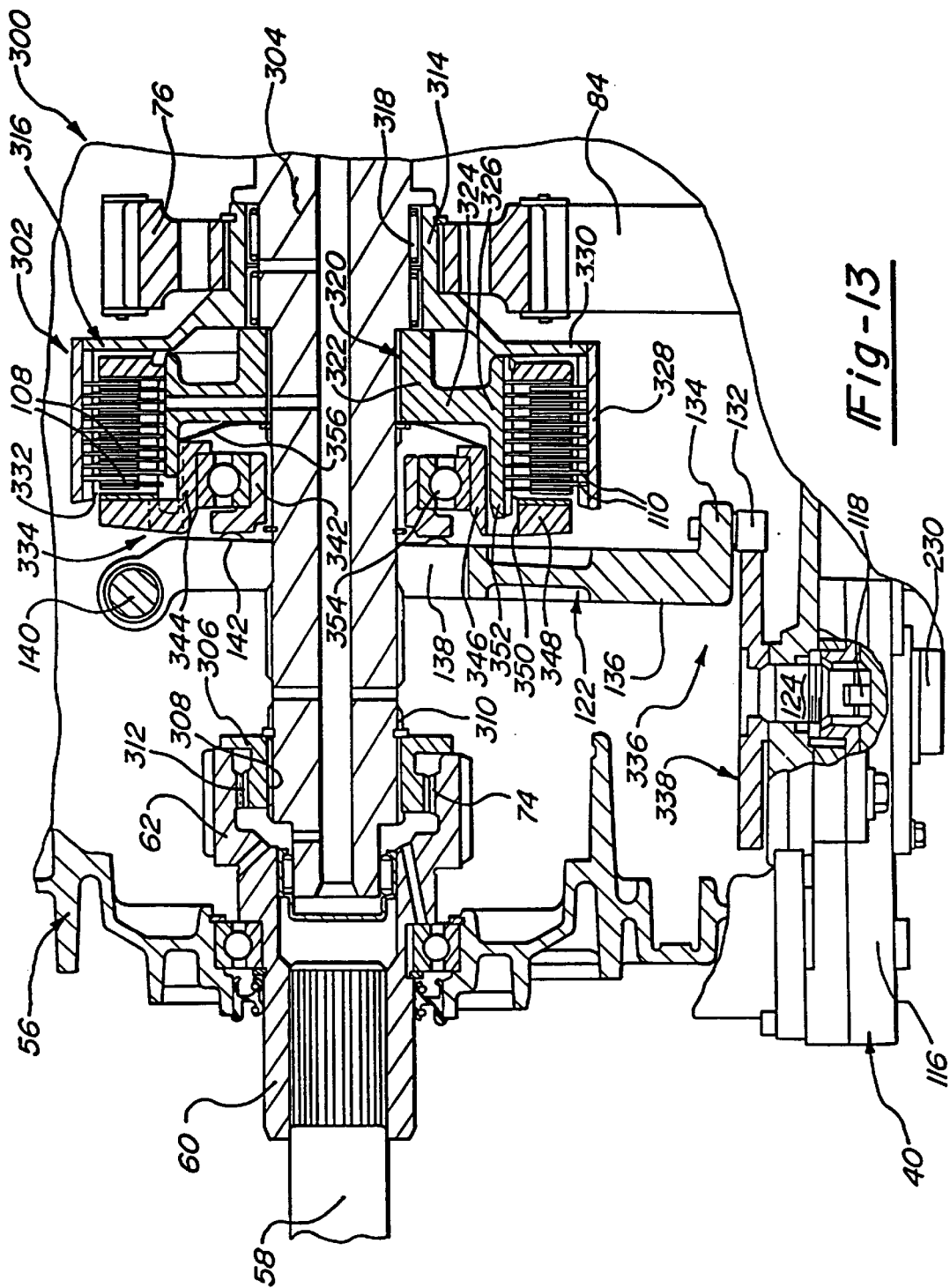
FIG. 13 is an enlarged partial view of FIG. 12 showing the various components in greater detail.
Figure 14:
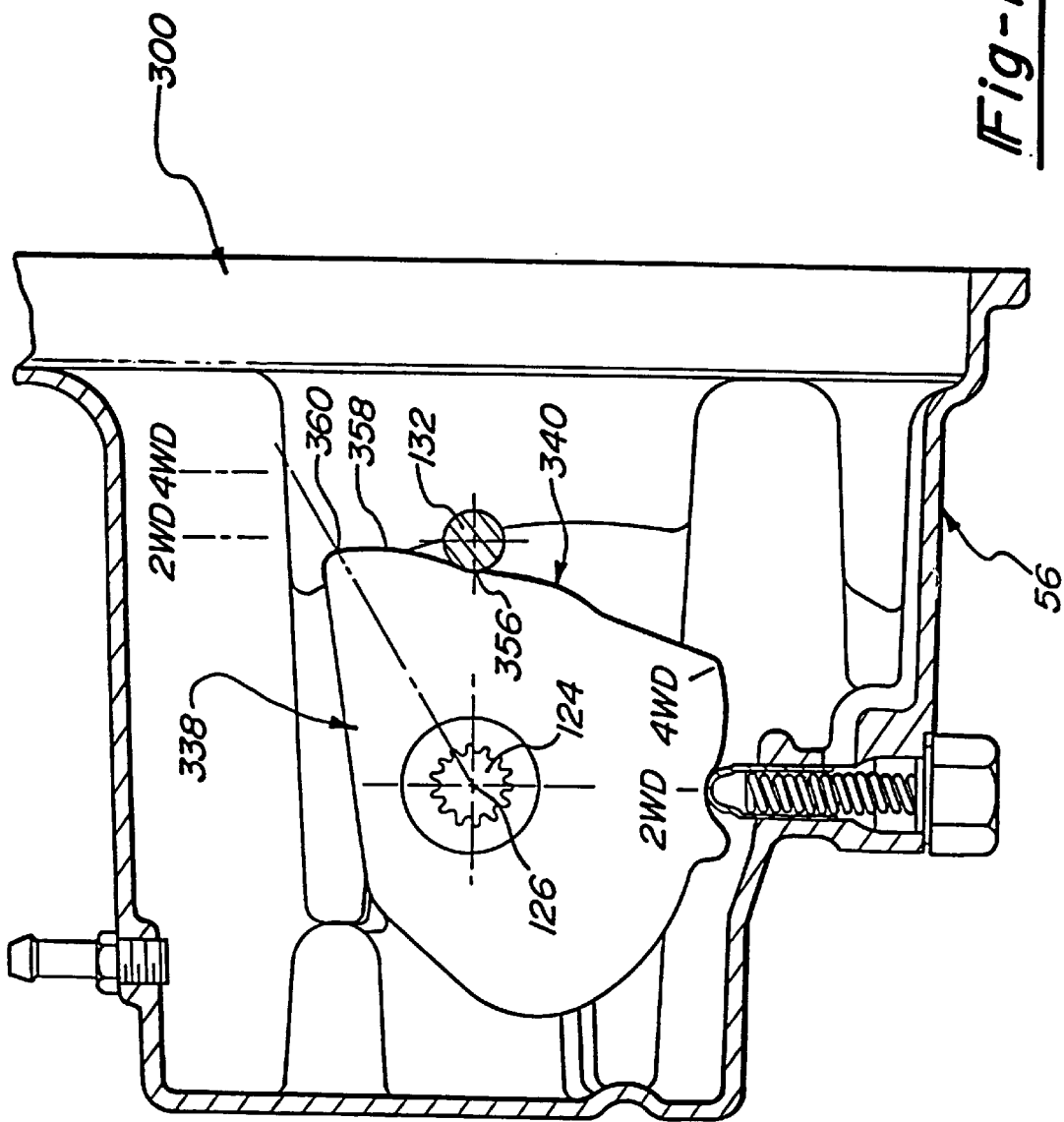
FIG. 14 is a side view of a sector plate associated with the drive mechanism shown in FIGS. 12 and 13.

With particular reference now to FIGS. 12 through 14, another alternative construction is shown for an electronically-controlled torque-modulatable transfer case, hereinafter designated by reference numeral 300. Transfer case 300 can be incorporated into the driveline arrangement shown in FIG. 1 for operation pursuant to the control format and characteristic relationships set forth in FIGS. 5 through 10. Accordingly, since the actuation and control of transfer case 300 is generally similar to that previously disclosed, like numbers are used to designate components thereof that are identical or substantially similar in structure and/or function to those disclosed relative to transfer case 20.

Transfer case 300 is adapted for incorporation into power transfer system 10 and includes an electronically-controlled torque transfer arrangement for transmitting drive torque to front wheels 12 in addition to rear wheels 14 for establishing the part-time and on-demand four-wheel drive modes. The torque transfer arrangement includes a transfer clutch 302 that is operable for transferring drive torque from first output member 30 to second output member 36, thereby delivering drive torque to front wheels 12. In a system equipped with mode select mechanism 44, actuator 40 is again operable for actuating transfer clutch 302 in response to a mode signal generated by the vehicle operator. When a two-wheel drive mode is available and selected, all drive torque is delivered from first output member 30 to rear wheels 14 and transfer clutch 302 is maintained in a "non-actuated" condition. When a part-time four-wheel drive mode is available and selected, transfer clutch 302 is fully actuated and maintained in a "lock-up" condition such that second output member 36 is, in effect, rigidly coupled for driven rotation with first output member 30. When transfer case 300 is operating in an "on-demand" drive mode, the amount of drive torque directed to front wheels 12 through transfer clutch 302 is automatically modulated as a function of various sensor signals for providing enhanced traction when needed.

With continued reference to FIGS. 12 through 14, the preferred construction for transfer case 300 will now be described with greater specificity. Transfer case 300 is shown to include housing 56 formed by a series of modular sections that are suitably interconnected in a conventional manner. Transmission output shaft 58 couples transmission 18 to input shaft 60 of transfer case 300 for supplying power thereto. Input shaft 60 has annular input gear 62 formed integral therewith. In the embodiment shown, first output member 30 is an elongated mainshaft 304 which is aligned on the longitudinal axis of input shaft 60 and is supported for rotation within housing 56. A sleeve 306 is concentrically supported on a forward end portion of mainshaft 304 and is fixed for rotation therewith by means of internal splines 308 engaged with corresponding sets of external splines 310 formed on mainshaft 304. In addition, sleeve 306 is formed with external clutch teeth 312 that are shown to be meshingly engaged with internal clutch teeth 74 formed on input gear 62. A snap ring is provided for locating and axially retaining sleeve 306 on mainshaft 304 relative to input gear 62. With this arrangement, drive torque is transferred without reduction from input shaft 60 to mainshaft 304.

As best seen from FIGS. 12 and 13, transfer clutch 302 is operably installed within transfer case 300 for selectively transferring drive torque from mainshaft 304 to front output shaft 88. Transfer clutch 302 is a mechanically-actuated multi-plate clutch assembly that is arranged to concentrically surround a portion of mainshaft 304. According to the particular construction shown, transfer clutch 302 includes a drive sprocket 76 that is fixed (i.e., splined) for rotation with an outer drum 316. As seen, outer drum 316 is supported on mainshaft 304 for rotation relative thereto by a suitable bearing assembly 318. Drive sprocket 76 drivingly engages chain 84 which is coupled to lower driven sprocket 86. As previously noted, driven sprocket 86 is coupled to, or an integral portion of, second output member 36 which is shown as front output shaft 88. As also noted, front output shaft 88 is operably connected to the motor vehicle's front wheel 12 via front drive shaft 34. Thus, outer drum 316 is fixedly secured to drive sprocket 76 so as to drive, or be driven by, front output shaft 88 of transfer case 300.

Transfer clutch 302 also includes an inner drum 320 that is fixed (i.e., splined) to mainshaft 304 for rotation therewith. In addition, outer drum 316 is arranged to concentrically surround inner drum 320 so as to form an internal chamber 332 therebetween. Thus, outer drum 316 and inner drum 320 are capable of rotating relative to one another. Inner drum 320 is shown as an integral component having an annular hub 322 splined to mainshaft 304, a web 324 extending radially from annular hub 322, and a cylindrical drum 326 formed at the opposite end of web 324 and extending coaxially to hub 322. Outer drum 316 has a cylindrical drum 328 which is enclosed at one end by a cover plate 330. As seen, cover plate 330 includes an integral tubular extension 314 that is supported on bearing assembly 318.

Disposed within internal chamber 332 are two sets of alternately interleaved friction clutch plates that are operable for transferring drive torque from mainshaft 304 and inner drum 320 to outer drum 316 and drive sprocket 76 so as to ultimately deliver drive torque to front output shaft 88 in response to a clutch engagement force applied to the clutch plates. One set of clutch plates, referred to as inner clutch plates 108, are mounted (i.e., splined) to an outer peripheral surface of cylindrical drum 326 for driven rotation with mainshaft 304. The second set of clutch plates, referred to as outer clutch plates 110, are mounted (i.e., splined) to an inner peripheral surface of cylindrical drum 328 for rotation with drive sprocket 76. In addition to inner clutch plates 108, a component of a sliding thrust mechanism 334 is mounted on cylindrical drum 326 of inner drum 320 for rotation therewith and axial movement with respect thereto. As will be described, thrust mechanism 334 is slidably movable on mainshaft 304 and is operable for frictionally compressing the interleaved clutch plates so as to cause drive torque to be transferred through transfer clutch 302 as a function of the clutch engagement force exerted thereon.

To provide means for selectively controlling the magnitude of the clutch engagement force exerted on thrust mechanism 334, actuator 40 is associated with a mechanical drive mechanism 336 and includes electrically-controlled rotary actuator 116. As noted, rotary actuator 116 is an electric gearmotor which is operable for generating an output torque, the value of which varies as a function of the magnitude of the electrical control signal applied thereto by controller 46. Drive mechanism 336 is interconnected to a rotary output member 118 of rotary actuator 116 for changing the output torque into an axially-directed force used for controlling the clutch engagement force applied to thrust mechanism 334 of transfer clutch 302. To this end, drive mechanism 336 includes a pivotable lever arm assembly 122 and a sector plate 338 that is rotatably driven through a limited range of angular motion by output member 118 of rotary actuator 116. More specifically, rotation of sector plate 338 is adapted to cause pivotable movement of lever arm assembly 122 which, in turn, causes sliding movement of thrust mechanism 334 for exerting the clutch engagement force on the interleaved clutch plates.

To generate the desired clutch engagement force, sector plate 338 includes a contoured peripheral edge 340 against which a crowned roller 132 rests. As noted, crowned roller 132 is fixed to a flange section 134 of a pivotable lever member 136 associated with lever arm assembly 122. Lever member 136 includes a forked section 138 which is bifurcated to surround mainshaft 304. The bifurcated ends of forked section 138 are retained for pivotal movement on transverse rail 140, the ends of which are retained in suitable sockets (not shown) formed in housing 56. In general, the contour of sector edge 340 is configured to cause pivotable movement of lever member 136 in response to rotation of sector plate 338 for controlling the clutch engagement force exerted on thrust mechanism 334 of transfer clutch 302.

Thrust mechanism 334 includes an annular inner bearing support 342 journally supported for sliding non-rotatable movement on mainshaft 304. While not shown, inner bearing support 342 includes an axial tang which is nested within a corresponding aperture in lever arm 136 for inhibiting rotation of inner bearing support 342 relative to mainshaft 304 and inner drum 320. Thrust mechanism 334 also includes an annular outer bearing support 344 that is coupled for rotation with inner drum 320. In particular, outer bearing support 344 includes a tubular segment 346 supported for sliding axial movement relative to cylindrical hub 326 and a radial plate segment 348 which acts as a pressure plate for frictionally compressing the interleaved clutch plates. As is also seen, a series of apertures 350 are formed in plate segment 348 of outer bearing support 344. Axial lugs 352 formed on the distal end of cylindrical drum 326 are nested within apertures 350 for coupling outer bearing support 344 for rotation with, and axial movement relative to, inner drum 320. Thus, outer bearing support 344 is supported for rotation with inner drum 320 and mainshaft 304 while inner bearing support 342 is held stationary relative thereto. A thrust bearing assembly 354 is mounted between inner bearing support 342 and outer bearing support 344 for facilitating such relative rotation therebetween while accommodating the thrust forces exerted on thrust mechanism 334. A series of buttons 142 mounted to lever arm 136 act on inner bearing support 342 for causing sliding movement of the entire thrust mechanism 334 in response to pivotable movement of lever arm assembly 122 for causing the clutch engagement force to be exerted by plate segment 348 of outer bearing support 344 on the interleaved clutch plates. Finally, an annular return spring 356 is retained between inner drum 320 and outer bearing support 344 for normally biasing sliding thrust mechanism 334 toward the clutch "non-actuated" condition.

With particular reference to FIG. 14, the means associated with drive mechanism 336 for establishing the range of pivotal movement of lever arm assembly 122 that is generated in response to rotation of sector plate 338 between two distinct sector positions will now be described. As stated, the specific contour of sector edge 340 is adapted to cause axial movement of crowned roller 132 upon rotation of sector 338. In the 2WD sector position shown, crowned roller 132 is positioned against edge 340 in close proximity to a terminal end 356 of an arcuate cam pathway 358 for establishing a two-wheel drive (2WD) roller position. With crowned roller 132 in the two-wheel drive (2WD) position, lever arm assembly 122 exerts a minimal clutch engagement force on thrust mechanism 334 such that transfer clutch 302 is considered to be operating in a "non-actuated" condition. In this non-actuated condition, transfer clutch 302 does not transfer drive torque from mainshaft 304 to front output 88.

As sector plate 338 is caused to rotate about axis 126 in a first direction (i.e., clockwise) from the position shown, the contour of cam pathway 358 causes axial displacement of crowned roller 132 toward a four-wheel drive (4WD) position on cam pathway 358, as indicated at 360. Such movement of crowned roller 132 causes concurrent pivotable movement of lever arm assembly 122 toward transfer clutch 302 which results in a proportional increase in the clutch engagement force that is exerted on clutch plates 108 and 110 by thrust mechanism 334. Moreover, once crowned roller 132 is moved axially to the four-wheel drive (4WD) position, lever arm assembly 122 exerts a maximum clutch engagement force on thrust mechanism 334, whereby transfer clutch 302 is considered to be in its fully "actuated" condition. As will be appreciated, rotation of sector plate 338 in the opposite direction (i.e., counterclockwise) from the 4WD sector position toward the 2WD sector position results in movement of crowned roller 132 toward its two-wheel drive (2WD) position, whereby lever arm assembly 122 is pivoted away from transfer clutch 302 for proportionally decreasing the clutch engagement force exerted on thrust mechanism 334.

During "on-demand" operation, a power transfer system equipped with transfer case 300 functions to continuously monitor and regulate the torque transfer characteristics in a manner that is independent of any deliberate action by the vehicle operator. As noted, the amount of torque transferred through transfer clutch 302 is proportional to the clutch engagement force, the value of which is determined by the particular position of crowned roller 132 on cam pathway 358 between its two-wheel drive (2WD) and four-wheel drive (4WD) positions due to controlled rotation of sector plate 338. Accordingly, the modulation range is established between the limits of bidirectional sector rotation as defined by movement of crowned roller 132 against cam pathway 358 between the (2WD) and (4WD) roller positions. Moreover, since the magnitude of the clutch engagement force generated by lever arm assembly 122 and applied to transfer clutch 302 is proportional to the magnitude of the output torque generated by rotary actuator 116 which, in turn, is proportional to the magnitude of the control signal (i.e., percentage duty cycle) applied by controller 46 to rotary actuator 116, the amount of drive torque transferred through transfer clutch 302 to front output shaft 88 is also proportional to the magnitude of the control signal. As such, the distribution ratio of drive torque between front output shaft 88 and mainshaft 304 of transfer case 300 may be selectively varied as a function of changes in the magnitude of the control signal for optimizing the tractive performance characteristics. Preferably, control parameters and relationships similar to those set forth in FIGS. 5 through 9 are applicable when transfer case 300 is used in continuous "on-demand" power transfer systems while controls similar to that shown in FIG. 10 are applicable to systems equipped with mode select mechanism 44. More preferably, the "on-demand" control schemes set forth in FIGS. 6 and 10 are slightly modified to eliminate use of an input signal from steering angle sensor 164 (FIG. 5). As such, the control constant (C) is not used in calculating the current value of the speed differential (ΔN) which, in turn, is used for controlling the modulated control of transfer clutch 302. As noted, mode select mechanism 44 can take the form of any mode selector device which is under the control of the vehicle operator for generating a mode signal indicative of the specific mode selected to offer the vehicle operator the option of deliberately choosing between at least one of the part-time drive modes and the on-demand drive mode.

Figure 15:
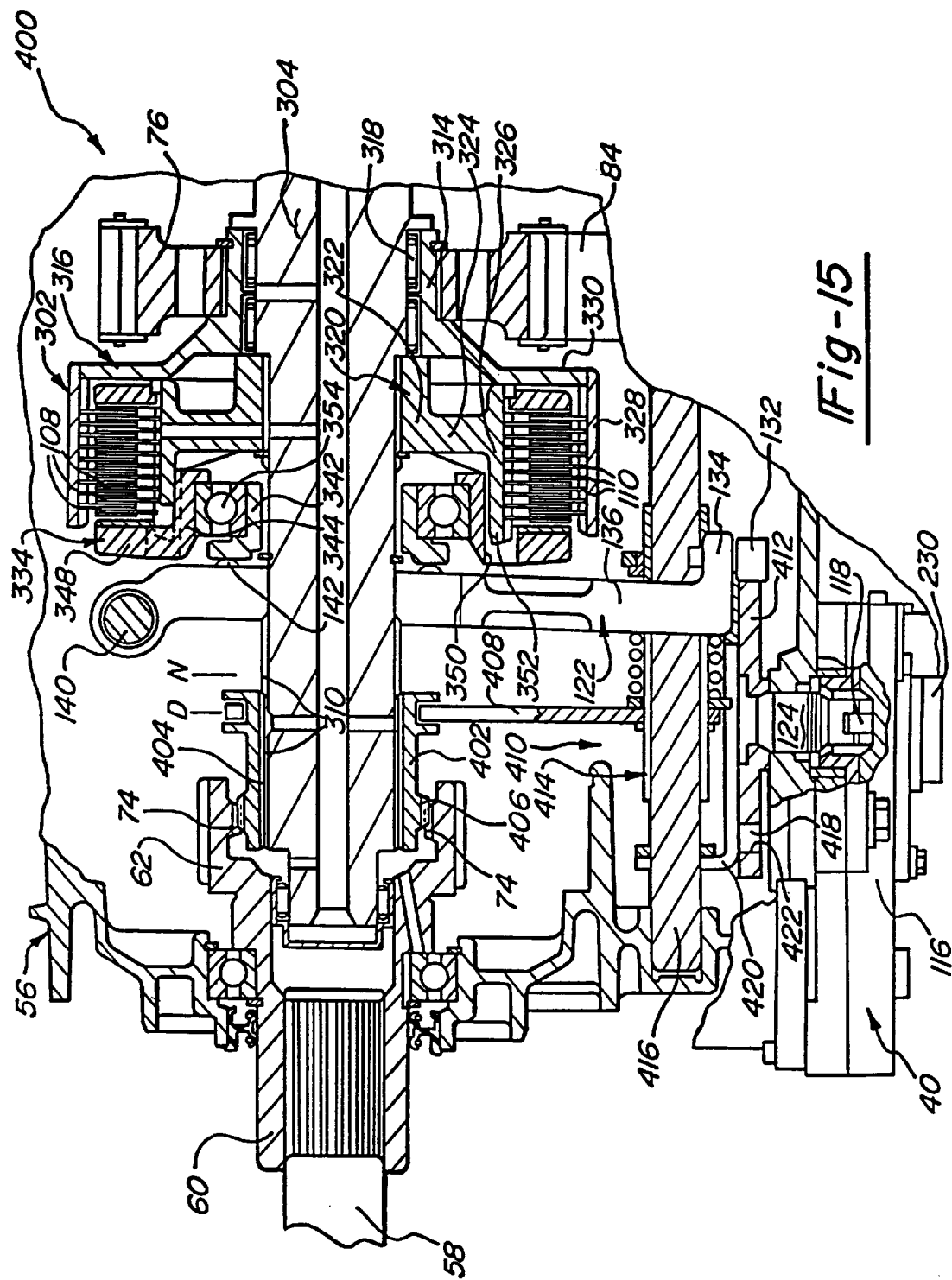
FIG. 15 is a partial sectional view of an alternative construction for the transfer case shown in FIGS. 12 through 14 which incorporates a modified drive mechanism having means for establishing a "Neutral" mode.
Figure 16:
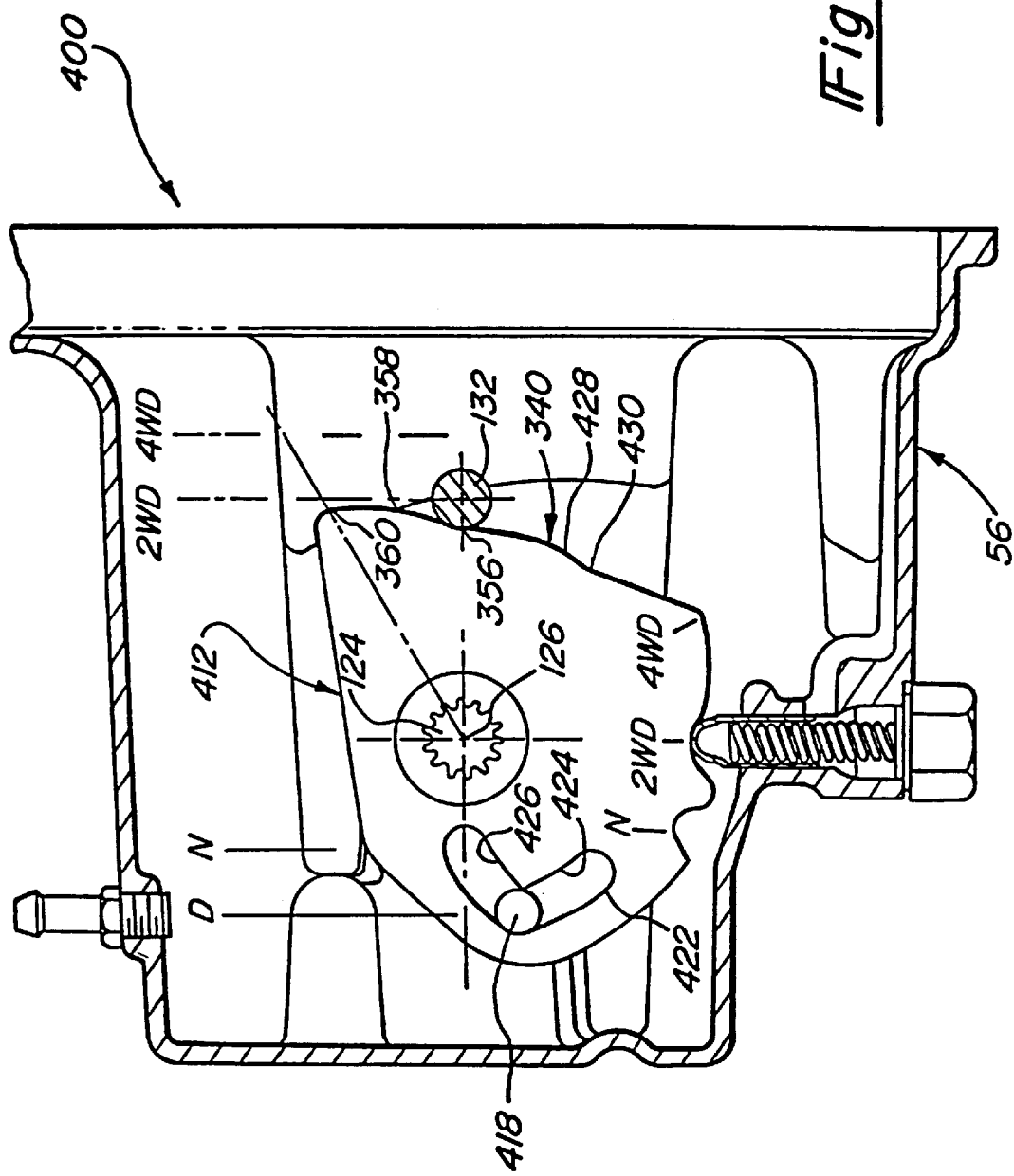
FIG. 16 is a side view of a sector plate associated with the modified drive mechanism shown in FIG. 15.

With reference now to FIGS. 15 and 16, a modified construction of transfer case 300, hereinafter designated by reference numeral 400, is shown. In general, transfer case 400 includes means for permitting the vehicle operator to selectively disconnect mainshaft 304 from input shaft 60 for establishing a nondriven or "Neutral" mode. Thus, transfer case 400 is particularly well-suited for incorporation into power transfer systems equipped with mode select mechanism 44 for establishing the Neutral mode in addition to the "on-demand" drive mode and one or more of the two-wheel drive and part-time four-wheel drive modes. Due to similarity of components, like numbers are used hereinafter to identify those components that are identical to or similar in structure and/or function to those previously described.

To provide means for selectively coupling and de-coupling mainshaft 304 with respect to input shaft 60, a shift sleeve 402 is supported for rotation with and axial sliding movement on mainshaft 304 due to the engagement of internal splines 404 with external splines 310 on mainshaft 304. In addition, shift sleeve 402 is formed with external clutch teeth 406 that are shown meshingly engaged with clutch teeth 74 formed on input gear 62. In this "coupled" position, drive torque is transferred from input shaft 60 through shift sleeve 402 to mainshaft 304 for establishing a drive connection through transfer case 400. Accordingly, construction line "D" identifies the position of shift sleeve 402 when such a "Drive" mode is established. However, when shift sleeve 402 is slid rearwardly to a "de-coupled" position wherein its clutch teeth 406 disengage clutch teeth 74 on input gear 62, then no drive torque is transmitted from input shaft 60 to mainshaft 304 and no power is transmitted through transfer case 400 to the vehicle's rear wheels 14. Accordingly, construction line "N" identifies the position of shift sleeve 402 when a non-driven "Neutral" mode is established. Such a provision for a Neutral mode arrangement is particularly desireable for flat towing (all four wheels on the ground) of the motor vehicle which can be accomplished without requiring disassembly of the front or rear drivelines.

Axial sliding movement of shift sleeve 402 between the two distinct (D) and (N) positions is caused by axial movement of a shift fork 408. As will be described, such movement of shift fork 408 is controlled by actuator 40 in response to the mode signal delivered to controller 46 via mode select mechanism 44. In particular, a drive mechanism 410 is used in association with rotary actuator 116 for selectively moving shift sleeve 402 between the (D) and (N) positions while concurrently controlling the magnitude of the clutch engagement force exerted on the interleaved clutch plates. Drive mechanism 410 is generally similar to drive mechanism 336 (FIGS. 12 through 14) with the exception that provisions have been made for selectively controlling movement of shift sleeve 402 in coordination with controlled actuation of transfer clutch 302.

Drive mechanism 410 includes a sector plate 412 that is rotatably driven through a limited range of angular motion by output member 118 of rotary actuator 116 for causing pivotable movement of lever arm assembly 122 which, in turn, controls the magnitude of the clutch engagement force exerted by thrust mechanism 334 on the clutch pack. In addition, sector plate 412 is adapted to concurrently control the axial position of shift fork 408 and, in turn, shift sleeve 402 in response to such controlled rotation of sector plate 412. As best seen from FIG. 15, shift fork 408 is coupled to a spring-loaded shift fork assembly 414 that is supported for sliding movement on a shift rail 416 and which is generally similar to that described in commonly owned U.S. Pat. No. 4,529,080 to Dolan, the disclosure of which is expressly incorporated by reference herein. It can also be seen that a range pin 418 is fixed to a U-shaped bracket 420 of shift fork assembly 414 which, in turn, is retained for sliding movement on shift rail 416. In addition, shift fork 408 is coupled to bracket 420 for movement therewith. While not directed to the novelty of this invention, shift fork assembly 414 includes a spring-biased arrangement adapted to normally bias shift fork 408 and shift sleeve 402 toward the drive (D) position to assist in completing meshed engagement of clutch teeth 406 on sleeve 402 with input gear teeth 74 during a Neutral mode to Drive mode shift.

From FIG. 16, it can be seen that sector plate 412 may be rotated about axis 126 by rotary actuator 116 to any of three distinct sector positions, as labelled "4WD", "2WD" and "N". To control movement of shift sleeve 402, sector plate 412 has an elongated range slot 422 formed therein into which range pin 418 extends. The contour of range slot 422 is configured to cause the desired translational movement of bracket 420, shift fork 408 and shift sleeve 402 in response to controlled bidirectional rotation of sector plate 412. Moreover, in view of incorporation of shift sleeve 402 into transfer case 400, the power transfer system is capable of establishing at least four distinct operative modes, namely a two-wheel drive mode, a part-time four-wheel drive mode, an on-demand drive mode and a Neutral mode. As will be described, the particular mode selected is established by the position of crowned roller 132 against contoured sector edge 340 and the position of range pin 418 within range slot 422, as concurrently established in response to the rotated position of sector plate 412. In operation, the vehicle operator selects the desired operative mode via mode select mechanism 44 which, in turn, signals controller 46 of the selection. Thereafter, controller 46 generates an electrical control signal that is applied to rotary actuator 116 for controlling the rotated position of sector plate 412. Moreover, for each of the two-wheel drive, part-time four-wheel drive and Neutral modes, sector plate 412 is controllably rotated to its corresponding 2WD, 4WD and N sector position. However, when the on-demand drive mode is selected, power transfer system 10 is operable for modulating the clutch engagement force applied to transfer clutch 302 as a function of various system and operator initiated inputs in the manner previously disclosed.

With continued reference to FIG. 16, means are shown for coordinating the axial movement of shift fork assembly 414 and the pivotable movement of lever arm assembly 122 upon rotation of sector plate 412 between the various sector positions for establishing the desired combination of drive modes. In general, the contour of range slot 422 is defined by a first guideway 424 and a second guideway 426 which respectively correspond to first and second cam pathways 358 and 428, respectively, that are sequentially formed on contoured edge 340. In the 2WD sector position shown, crowned roller 132 is positioned on first cam pathway 358 at point 356 for establishing a two-wheel drive (2WD) roller position. As previously noted, with crowned roller in its two-wheel drive (2WD) position, lever arm assembly 122 does not exert a sufficient clutch engagement force on thrust mechanism 334 to transfer drive torque through transfer clutch 302, whereby transfer clutch 302 is considered to be in its "non-actuated" condition. Concurrently, range pin 418 is shown in position within range slot 422 in close proximity to one end of first guideway 424 for axially locating shift sleeve 402 in the drive (D) position.

As sector plate 412 is caused to rotate about axis 126 in a first (i.e., clockwise) direction from the position shown, the contour of first cam pathway 358 causes axial displacement of crowned roller 132 toward a four-wheel drive (4WD) position. Such axial movement of crown roller 132 causes concurrent pivotable movement of lever arm 136 which results in a proportional increase in the clutch engagement force exerted on thrust mechanism 334. With crowned roller 132 in its four-wheel drive (4WD) position, lever arm assembly 122 exerts a maximum clutch engagement force on thrust mechanism 334 such that transfer clutch 302 is considered to be operating in its fully "actuated" condition. As such, drive torque is transferred from mainshaft 302 to drive sprocket 76 through the interleaved clutch plates 108 and 110 to transmit drive torque to front output shaft 88. Concurrent with such axial movement of crowned roller 132 along first cam pathway 358 toward its four-wheel drive (4WD) position, range pin 418 is guided within first guideway 424 of range slot 422 for maintaining shift sleeve 402 in the drive (D) position. Thus, first guideway 424 is a "dwell" slot having a common radius centered on axis 126 for maintaining shift sleeve 402 in the drive (D) position during axial movement of crowned roller 132 between its (2WD) and (4WD) positions. As discussed, when transfer case 400 is operating in the on-demand mode, actuator 116 is actuated in accordance with specific predefined relationships established in response to the current value of the sensor input signals for rotatably driving sector plate 412 between the 2WD and 4WD sector positions such that the amount of drive torque transferred through transfer clutch 302 is proportional to the clutch engagement force, the value which is determined by the particular position of crowned roller 132 between its (2WD) and (4WD) positions along first cam pathway 358.

According to the embodiment disclosed, power transfer system 10 is further operable to permit transfer case 400 to be shifted into the non-driven or "Neutral" mode. More particularly, upon mode select mechanism 44 signalling selection of the "Neutral" mode, rotary actuator 116 rotates sector plate 412 in the second direction (i.e., counterclockwise) until crowned roller 132 is guided along second cam pathway 428 of contoured edge 340 while range pin 418 is concurrently guided within second guideway 426 of range slot 422. Preferably, the contour of the second cam pathway 428, which begins at point 356 and ends at point 430, is designed to retain crowned roller 132 in the two-wheel drive (2WD) position, whereby transfer clutch 302 is maintained in the non-actuated condition. More preferably, the contour of second cam pathway 428 is an arc having a common radius with its origin located on axis 126. During such rotation of sector plate 412, however, range pin 418 is axially displaced due to the contour of second guideway 426 for axially moving shift sleeve 402 from the drive (D) position to the Neutral (N) position. Thus, during such axial movement of shift sleeve 402, drive mechanism 410 is adapted to maintain transfer clutch 302 in its non-actuated condition to eliminate the possibility of overloading transfer clutch 302. As will be appreciated, when mode select mechanism 44 signals that the vehicle operator wants to shift out of the Neutral mode and into one of the available drive modes, actuator 116 rotates sector plate 412 int he first direction (i.e., clockwise) at least to the 2WD sector position wherein crowned roller 132 engages first cam pathway 358 and range pin 418 is retained within first guideway 424.

In association with power transfer systems utilizing mode select mechanism 44, the present invention also incorporates means for maintaining the selected mode upon power interruption to rotary actuator 116. To this end, a brake 230 is provided that is an electrically-controlled device operable in a "power-off" condition for braking output member 118 of rotary actuator 116. In operation, control module 150 delivers an electrical signal to brake 230 to maintain it in a released or "power-on" condition. During controlled movement of output member 118, brake 230 is maintained in its released "power-on" condition. However, upon interruption of power to brake 230, brake torque is generated for inhibiting linear movement of output member 118. Thus, once output member 118 is positioned in one of its defined positions, power to brake 230 is interrupted for positively retaining sector plate 120 in the desired rotated position. Thereafter, power to rotary actuator 116 can be interrupted to minimize its on-time service requirements.

Figure 17:
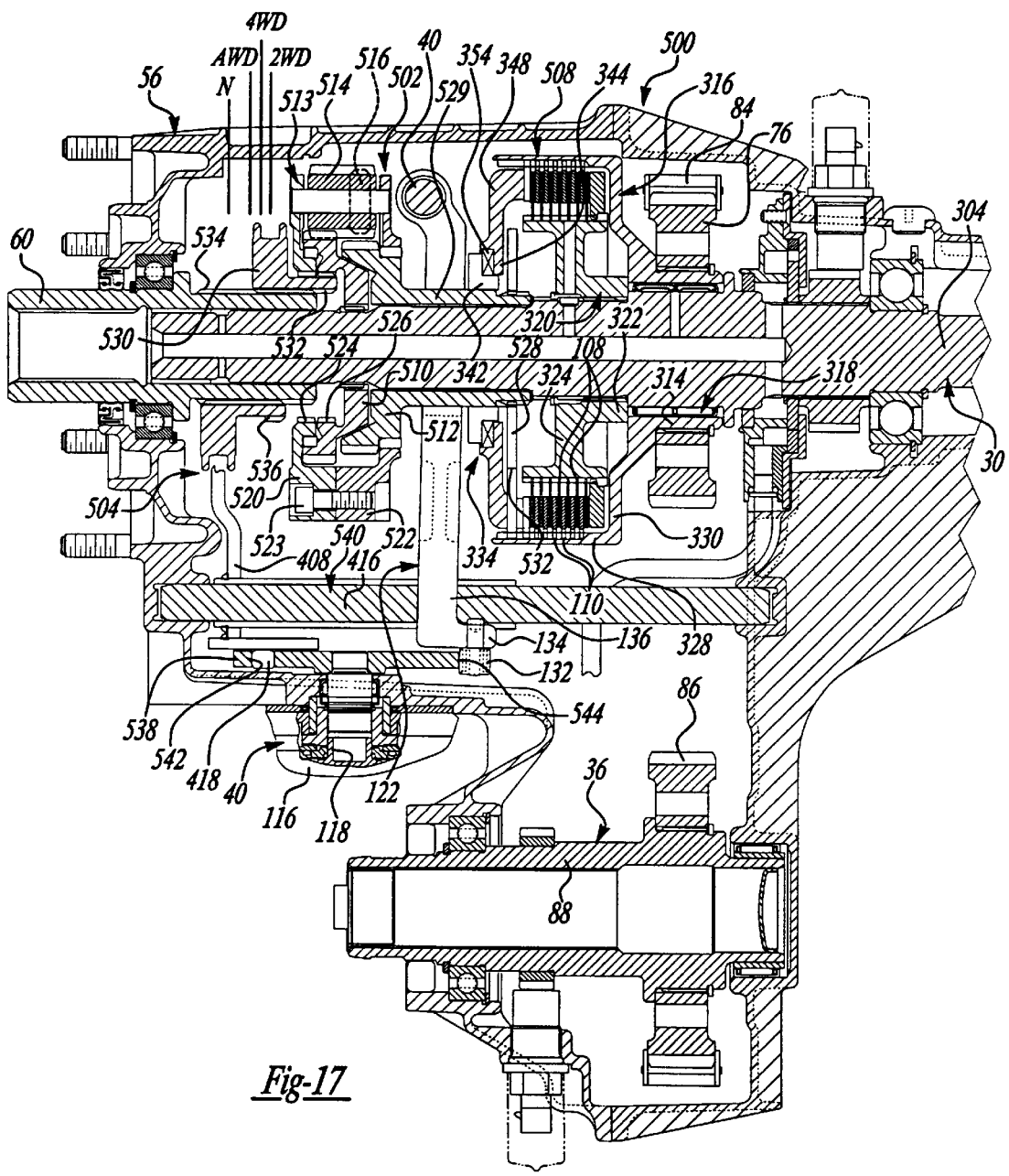
FIG. 17 is a sectional view of a transfer case constructed according to another alternative embodiment of the present invention.
Figure 18:
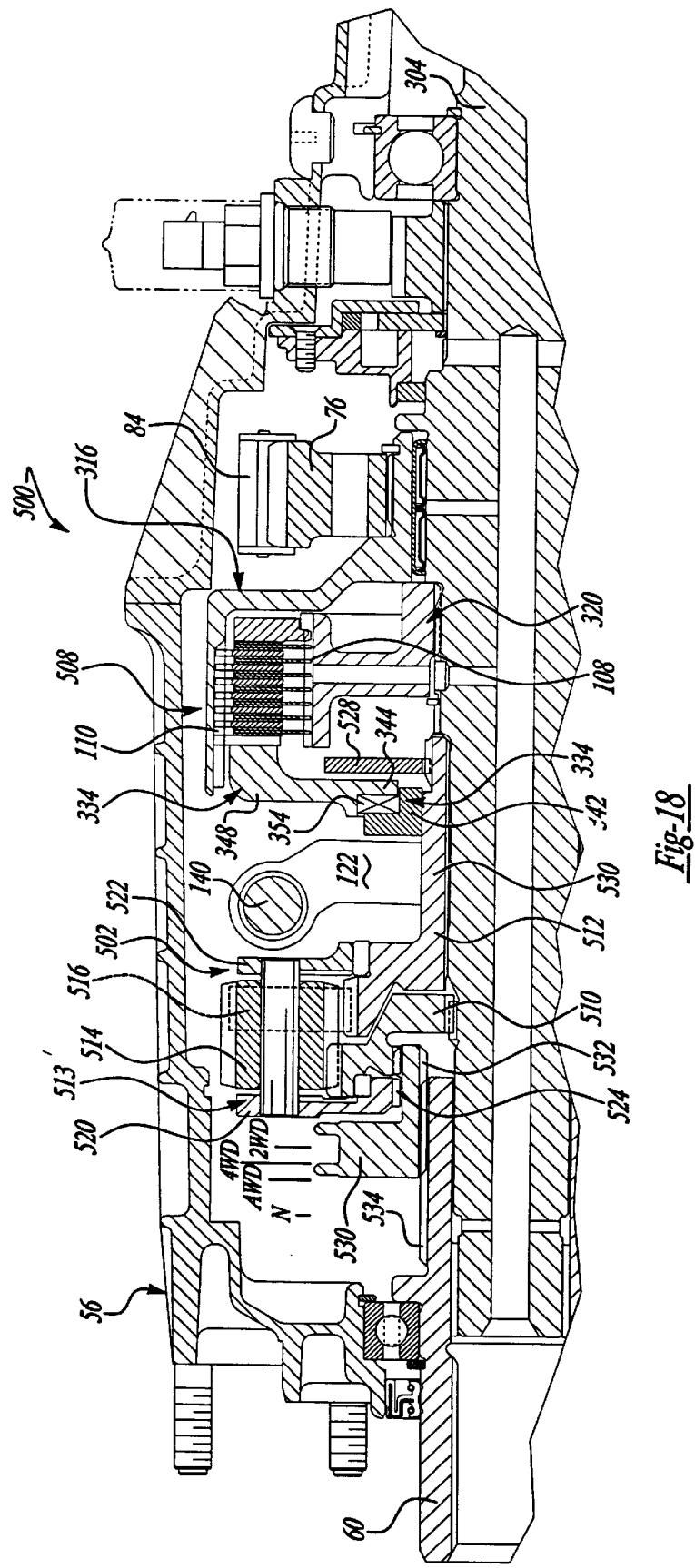
FIG. 18 is an enlarged partial view of FIG. 17.

Referring to FIGS. 17 and 18, a full-time transfer case 500 is disclosed which can be incorporated into power transfer system 10. Since many of the components associated with transfer case 500 are similar in structure and/or function to those associated with transfer case 400, like reference numerals are used hereinafter to identify corresponding components. Transfer case 500 includes an input shaft 60, a rear output shaft 304, a front output shaft 88, a center or interaxle differential 502, a mode shift mechanism 504 for selectively coupling input shaft 60 to differential 502, and a transfer clutch 508. In operation, transfer case 500 is operable to establish at least three different drive modes between input shaft 60 and front and rear output shafts 88 and 304, respectively. To this end, differential 502 is a planetary gearset having a first sun gear 510 fixed (i.e., splined) to rear output shaft 304, a second sun gear 512 rotatably supported on rear output shaft 304, and a planet carrier 513 rotatably supporting a set of first pinion gears 514 and a set of second pinion gears 516. First pinion gears 514 mesh with first sun gear 510 while second pinion gears 516 mesh with second sun gear 512. Additionally, first and second pinion gears 514 and 516 are arranged in meshed pairs. Planet carrier 513 includes a front carrier ring 520 and a rear carrier ring 522 interconnected by bolts 523. As best seen from FIG. 18, clutch teeth 524 are formed on front carrier ring 520 and clutch teeth 526 are formed on first sun gear 510. To provide means for connecting second sun gear 512 to front output shaft 88, a thrust plate 528 is shown fixed (i.e., splined) between an end of an axial extension 529 of second sun gear 512 and cylindrical drum 328 of outer drum 316 of transfer clutch 508.

To provide means for selectively coupling input shaft 60 to differential 502, mode shift mechanism 504 includes a shift sleeve 530 which is supported for rotation with and sliding axial movement on input shaft 60 due to engagement of its internal splines 532 with external splines 534 on shaft 60. Shift sleeve 530 is also shown to include external clutch teeth 536 which are selectively engageable with clutch teeth 524 on front carrier ring 520 and/or with clutch teeth 526 on first sun gear 510. When shift sleeve 530 is in the position identified by construction line "N" (as shown in the lower portion of FIG. 17), its clutch teeth 536 are disengaged from clutch teeth 524 and 526 of carrier ring 520 and first sun gear 510, respectively, wherein the non-driven Neutral mode is established with no drive torque transferred from input shaft 60 to either of output shafts 304 and 88. When shift sleeve 530 is in the position identified by construction line "AWD", its clutch teeth 536 are meshed only with clutch teeth 524 of front carrier ring 520 such that input shaft 60 is coupled to drive planet carrier 513. Such driven rotation of planet carrier 513 acts to drive front output shaft 88 via second sun gear 512 and to drive rear output shaft 304 via first sun gear 510. The torque distribution ratio between front output shaft 88 and rear output shaft 304 is defined by the geometry of the meshed gears associated with differential 502. With shift sleeve 530 in its AWD position, a full-time or "differentiated" four-wheel drive mode is established wherein speed differentiation between front output shaft 88 and rear output shaft 304 is permitted. When shift sleeve 530 is moved to the position identified by construction line "4WD", its clutch teeth 536 are concurrently meshed with clutch teeth 524 on carrier ring 520 and clutch teeth 526 on first sun gear 510. Thus, planet carrier 513 and first sun gear 510 are both directly driven by input shaft 60, whereby differential 502 is effectively locked to prevent speed differentiation between sun gears 510 and 512 and, thus, between output shafts 304 and 88, thereby establishing a Locked or "non-differentiated" four-wheel drive mode. Finally, when shift sleeve 530 is in the position identified by construction line "2WD", its clutch teeth 536 are only meshed with clutch teeth 526 on first sun gear 510 such that input shaft 60 is directly coupled to rear output shaft 304, thereby establishing a two-wheel drive mode in which all drive torque is transferred to rear output shaft 304.

Transfer clutch 508 is operable for controlling speed differentiation and the resulting torque distribution between front output shaft 88 and rear output shaft 304 when transfer case 500 is operating in its full-time four-wheel drive mode. Transfer clutch 508 is generally similar to transfer clutch 302 with the exception that thrust mechanism 334 is now supported for axial sliding movement on extension 530 of second sun gear 512. As before, thrust mechanism 334 functions to compress the interleaved clutch plates 108 and 110 as a function of the clutch engagement force exerted thereon. As seen, thrust plate 528 includes a series of apertures 532 through which portions of apply plate 348 extend. Thus, outer bearing support 344 and apply plate 348 are supported for rotation with second sun gear 512 and outer drum 316. As before, pivotal movement of lever arm 136 causes sliding movement of thrust mechanism 334.

Axial movement of shift sleeve 530 and pivotal movement of lever assembly 122 is controlled by actuator 40 in response to mode signals delivered to controller 46 via mode select mechanism 44. In particular, mode shift mechanism 504 is used in association with rotary actuator 116 for selectively moving shift sleeve between its four distinct (i.e., N, AWD, 4WD and 2WD) positions while concurrently controlling the magnitude of the clutch engagement force exerted on the interleaved clutch plates of transfer clutch 508 when shift sleeve 530 is in its AWD position. Mode shift mechanism 504 includes a sector plate 538 rotatably driven by output member 118 of rotary actuator 116. A range pin 418 is fixed to a bracket assembly 540 supported on rail 416 to which shift fork 408 is fixed. Range pin 418 is retained in a range slot 542 which is contoured such that rotation of sector plate 538 causes axial movement of shift sleeve 530. In a similar fashion, crowned roller 132 rides against a cam surface 544 of sector plate 538. The contour of cam surface 544 is developed in coordination with the contour of range slot 542 such that lever arm assembly 122 is normally maintained in a first position when shift sleeve 530 is in any of its N, 4WD and 2WD positions to prevent the transfer of drive torque through transfer clutch 508. In contrast, cam surface 544 permits movement of lever arm assembly 122 between the first position and a second position when shift sleeve 530 is in its AWD position. In its first position, lever arm assembly 122 exerts a minimum clutch engagement force on the interleaved clutch plates such that transfer clutch 508 is in its non-actuated condition, whereby no drive torque is transferred through transfer clutch 508. In its second position, lever arm assembly 122 exerts a maximum clutch engagement force on the interleaved clutch plates such that transfer clutch 508 is in its fully actuated condition.

In operation, the vehicle operator selects the desired mode via mode select mechanism 44 which, in turn, signals controller 46. When the Neutral mode is selected, sector plate 538 is rotated to a position locating shift sleeve 530 in its N position and lever arm assembly 122 in its first position. When the full-time four-wheel drive mode is selected, sector plate 538 is first rotated to a position for locating shift sleeve 530 in its AWD position and lever arm assembly 122 in its first position. Thereafter, power transfer system 10 is operable to modulate the clutch engagement force applied to transfer clutch 508, as a function of various input signals, by rotating sector plate 538 through a range of motion causing corresponding movement of lever arm 122 between its first and second positions while maintaining shift sleeve 530 in its AWD position. When the Locked four-wheel drive mode is selected, sector plate 538 is rotated to a position which locates shift sleeve 530 in its 4WD position while lever arm 122 is located in its first position. Finally, when the two-wheel drive mode is selected, sector plate 538 is rotated to a position which locates shift sleeve 530 in its 2WD position while maintaining lever arm assembly 122 in its first position.

Figure 19:
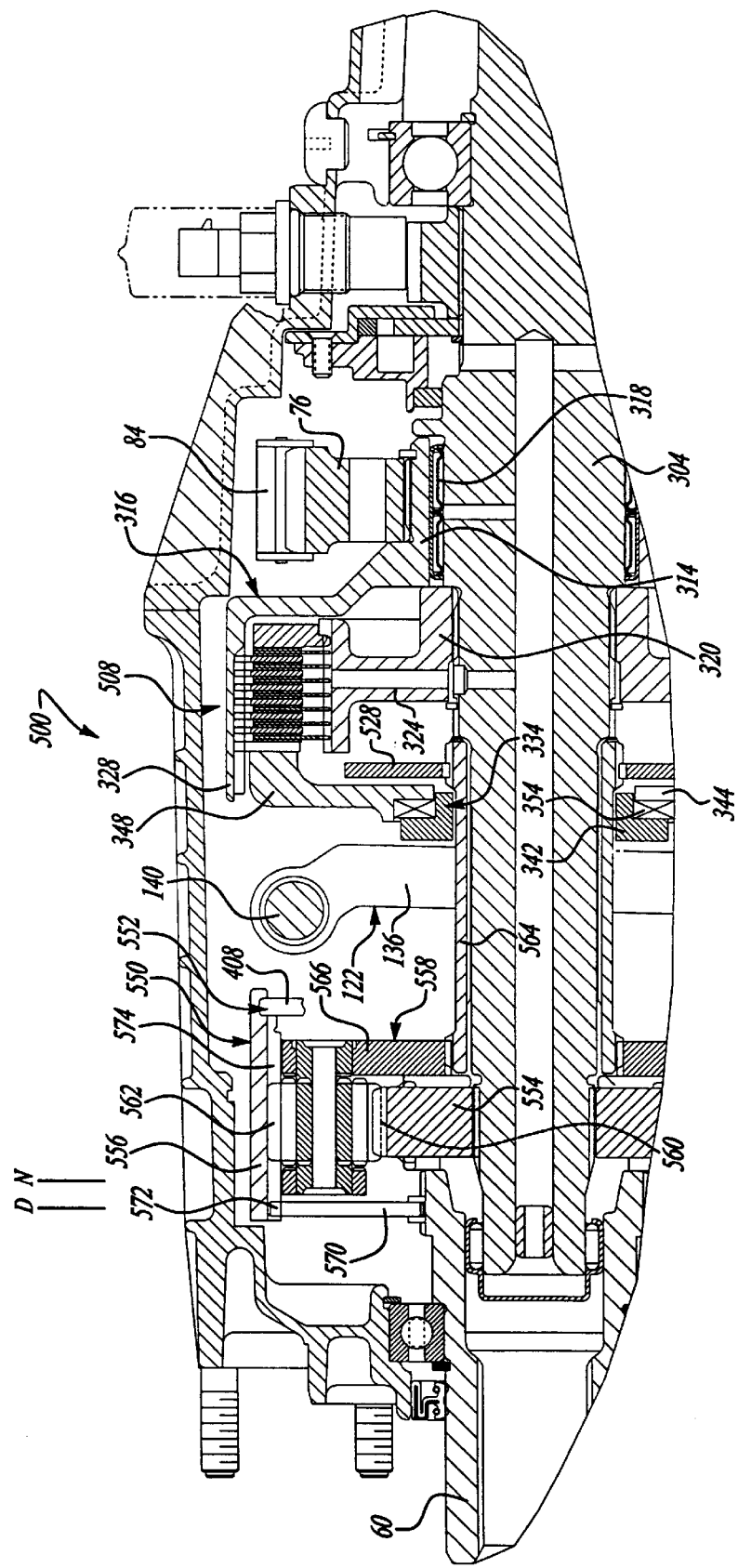
FIG. 19 is a partial sectional view of a transfer case constructed according to yet another alternative embodiment of the present invention.

Referring to FIG. 19, transfer case 500 is now shown equipped with a modified interaxle differential 550 which works in cooperation with a mode shift mechanism 552 for establishing at least three distinct drive modes. Differential 550 is a planetary gearset having a sun gear 554 fixed to rear output shaft 304, an annular gear 556, and a planet carrier 558 rotatably supporting a set of first pinion gears 560 and a set of second pinion gears 562. First pinion gears 560 are meshed with sun gear 554. Second pinion gears 562 are meshed with annulus gear 556. In addition, each one of first pinion gears 560 is meshed with one of second pinion gears 562 such that they are arranged in meshed pairs between sun gear 554 and annulus gear 556. To provide means for coupling planet carrier 558 to front output shaft 88, thrust plate 528 is shown fixed (i.e., splined) to one end of a quill shaft 564 rotatably supported on rear output shaft 304 while the other end of quill shaft 564 is fixed (i.e., splined) to a rear carrier ring 566 of planet carrier 558. As seen, thrust plate 528 is also fixed (i.e., splined) to drum 328 of outer drum 316 of transfer clutch 508. Finally, a drive plate 570 is fixed (i.e., splined) for rotation with input shaft 60 and has external clutch teeth 572 which are shown in meshed engagement with gear teeth 574 of annulus gear 556. Thus, annulus gear 556 is the input member of differential 550 while sun gear 554 and planet carrier 558 act as its output members. As is understood, the gear geometry associated with the gear components of differential 550 dictate the torque split normally delivered between front output shaft 88 and rear output shaft 304.

To provide means for selectively coupling and uncoupling input shaft 60 with respect to differential 550, mode shift mechanism 552 includes a mode fork 408 secured to annulus gear 556 for axially moving annulus gear 556 between two distinct positions. When annulus gear 556 is in the "D" position shown, its gear teeth 574 are meshed with clutch teeth 572 on drive plate 570 such that input shaft 60 drives planet carrier 558 for establishing a full-time four-wheel drive mode permitting speed differentiation between front output shaft 88 and rear output shaft 304. When annulus gear 556 is in its "N" position, its gear teeth 574 are disengaged from clutch teeth 572 of drive plate 570 such that the non-driven Neutral mode is established.

Axial sliding movement of annulus gear 556 between its two distinct positions is controlled by axial movement of shift fork 408 which is caused by rotation of sector plate 412 via a control signal sent to rotary actuator 116 from controller 46 in response to a mode signal sent via mode select mechanism 44. As previously disclosed, sector plate 412 controls coordinated movement of shift fork 408 and lever arm assembly 122. In a manner similar to that described in reference to the on-demand system in FIG. 16, sector plate 412 is used in conjunction with full-time transfer case 500 of FIG. 19 to selectively couple input shaft 60 to differential 550 and to control slip across interaxle differential 550. When a mode signal indicates selection of the Full-time four-wheel drive mode, sector plate 412 maintains shift fork 408 in its D position while causing lever arm assembly 122 to pivot between a first position whereat a minimum clutch engagement force is exerted on apply plate 348 and a second position whereat a maximum clutch engagement force is exerted thereon. As previously noted, the magnitude of the clutch engagement force is controlled in response to the sensor input signals and is automatic without any input on the part of the vehicle operator. If the Neutral mode is selected, rotary actuator 116 rotates sector plate 412 to a position locating shift fork 408 in its N position while locating lever arm assembly 122 in its first position. If the mode signal includes selection of a Locked four-wheel drive mode, sector plate 412 is rotated to a position whereat shift fork 408 is located in its D position and lever arm assembly 122 is held in its second position, thereby fully-actuating transfer clutch 508. Brake 230 may be used again in conjunction with rotary actuator 116 to assist in maintaining transfer clutch 508 in its fully-actuated mode when the Locked four-wheel drive mode is selected.

When the Full-time four-wheel drive mode is selected for the transfer cases shown in FIGS. 17 through 19, controller 46 can be programmed to automatically control actuation of transfer clutch 508 pursuant to an "ON/OFF" control scheme. In such an arrangement, transfer clutch 508 is normally maintained in a non-actuated condition to permit speed differentiation between front and rear output shafts 88 and 304, respectively. However, when the sensor input signals indicate a vehicular condition exceeding a predetermined threshold value, transfer clutch 508 is fully actuated for locking-up center differential 502 such that front and rear output shafts 88 and 304 are, in effect, rigidly coupled. Preferably, the vehicular conditions used for controlling actuation of transfer clutch 508 is the vehicle speed (V) and the speed differential (ΔN) between front drive shaft 34 and rear drive shaft 28. Thereafter, transfer clutch 508 is returned to its non-actuation condition when the sensor input signals indicate that the magnitude of the vehicular condition is less than the predetermined threshold value. Alternatively, controller 46 can be programmed in an "ADAPTIVE" control scheme to regulate the actuated condition of transfer clutch 508 between its non-actuated and fully actuated limits for varying the magnitude of speed differentiation and drive torque transmitted across center differential 502 as a function of the sensor input signals. In operation, transfer clutch 508 increases the drive torque delivered to the slower turning output shaft while concurrently decreases the drive torque delivered to the faster turning output shaft in an amount equal to the torque capacity of the clutch at a given actuated state. The control system disclosed in FIGS. 5 through 10 for the on-demand control of the transfer clutch is applicable for the adaptive control of transfer clutch 508. Utilizing either of the above-noted control schemes, control over actuation of transfer clutch 508 is automatic and does not require any act or mode selection on the part of the vehicle operator.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case, comprising:
   an input shaft;
   a first output shaft;
   a second output shaft;
   an interaxle differential having a first output member fixed to said first output shaft, a second output member fixed to said second output shaft, and an input member driving said first and second output members while permitting speed differentiation therebetween;
   a transfer clutch operable in a non-actuated condition to permit unrestricted relative rotation between said first and second output shafts, and said transfer clutch is operable in a fully-actuated condition to inhibit relative rotation between said first and second output shafts;
   a shift sleeve supported for rotation with said input shaft and movement between first and second positions, said shift sleeve is operable in said first position to couple said input shaft to said input member of said interaxle differential for establishing a full-time four-wheel drive mode, and said shift sleeve is operable in said second position to couple said input shaft to said input member and said first output member of said interaxle differential for establishing a locked four-wheel drive mode; and
   an actuator for controlling movement of said shift sleeve between said first and second positions and for controlling the actuated condition of said transfer clutch when said shift sleeve is in said first position.

2. The transfer case of claim 1 wherein said shift sleeve is further movable to a third position whereat said input shaft is uncoupled from said input member and said first output member of said interaxle differential for establishing a Neutral non-driven mode, and wherein said actuator is operable for moving said shift sleeve into and out of said third position.

3. The transfer case of claim 2 wherein said shift sleeve is further movable to a fourth position whereat said input shaft is coupled to said first output member of said interaxle differential for establishing a two-wheel drive mode.

4. The transfer case of claim 1 wherein said shift sleeve is movable to a third position whereat said input shaft is coupled to said first output member of said interaxle differential for establishing a two-wheel drive mode.

5. The transfer case of claim 1 wherein said first output member is a first sun gear, said second output member is a second sun gear, and said input member is a planet carrier rotatably supporting pinion gears meshed with said first and second sun gears.

6. The transfer case of claim 1 further comprising a sector plate movable in response to actuation of said actuator, and a lever arm supported for movement between a first position whereat a minimum clutch engagement force is exerted on said transfer clutch for defining said non-actuated condition and a second position whereat a maximum clutch engagement force is exerted on said transfer clutch for defining said fully-actuated condition, and wherein said shift sleeve and said lever arm are coupled to said sector plate such that movement of said sector plate causes coordinated movement of said shift sleeve and said lever arm.

7. A transfer case, comprising:
   an input shaft;
   a first output shaft;
   a second output shaft;
   an interaxle differential having a first output member fixed to said first output shaft, a second output member fixed to said second output shaft, and an input member driving said first and second output members while permitting speed differentiation therebetween;
   a transfer clutch operable in a non-actuated condition to permit unrestricted relative rotation between said first and second output shafts, and said transfer clutch is operable in a fully-actuated condition to inhibit relative rotation between said first and second output shafts;
   a shift sleeve supported for rotation with said input shaft and movement between first and second positions, said shift sleeve is operable in said first position to couple said input shaft to said input member of said interaxle differential for establishing a full-time four-wheel drive mode, and said shift sleeve is operable in said second position to uncouple said input shaft from said input member of said interaxle differential for establishing a neutral non-driven mode; and
   an actuator for controlling movement of said shift sleeve between said first and second positions and for controlling the actuated condition of said transfer clutch when said shift sleeve is in said first position.

8. The transfer case of claim 7 wherein said shift sleeve is movable to a third position whereat said input shaft is coupled to said first output member of said interaxle differential for establishing a two-wheel drive mode.

9. The transfer case of claim 7 wherein said first output member is a first sun gear, said second output member is a second sun gear, and said input member is a planet carrier rotatably supporting pinion gears meshed with said first and second sun gears.

10. The transfer case of claim 7 further comprising a sector plate movable in response to actuation of said actuator, and a lever arm supported for movement between a first position whereat a minimum clutch engagement force is exerted on said transfer clutch for defining said non-actuated condition and a second position whereat a maximum clutch engagement force is exerted on said transfer clutch for defining said fully-actuated condition, and wherein said shift sleeve and said lever arm are coupled to said sector plate such that movement of said sector plate causes coordinated movement of said shift sleeve and said lever arm.

11. A power transfer system for a four-wheel drive vehicle having a power source and first and second drivelines, comprising:
   a transfer case having an input shaft driven by the power source, a first output shaft coupled to the first driveline, a second output shaft coupled to the second driveline, an interaxle differential having a first output member fixed to said first output shaft, a second output member fixed to said second output shaft, and an input member driving said first and second output members while permitting speed differentiation therebetween, a transfer clutch operable in a non-actuated condition to permit unrestricted relative rotation between said first and second output shafts, and said transfer clutch is operable in a fully-actuated condition to inhibit relative rotation between said first and second output shafts, a shift sleeve supported for rotation with said input shaft and movement between first and second positions, said shift sleeve is operable in said first position to couple said input shaft to said input member of said interaxle differential for establishing a full-time four-wheel drive mode, and said shift sleeve is operable in said second position to couple said input shaft to said input member and said first output member of said interaxle differential for establishing a locked four-wheel drive mode, and an actuator which is movable for controlling movement of said shift sleeve between said first and second positions and for controlling the actuated condition of said transfer clutch;

a sensor for detecting an operating characteristic of the vehicle and generating a sensor input signal in response thereto;

a mode selector for permitting selection of one of said full-time and locked four-wheel drive modes and for generating a mode signal indicative of the selected drive mode; and a controller for receiving said sensor input signal and said mode signal and controlling movement of said actuator in response thereto, said controller operable for varying the actuated condition of said transfer clutch between its non-actuated and fully-actuated conditions in accordance with the magnitude of said sensor input signal when said full-time four-wheel drive mode is selected.

12. The power transfer system of claim 11 wherein said shift sleeve is further movable to a third position whereat said input shaft is uncoupled from said input member and said first output member of said interaxle differential for establishing a Neutral non-driven mode, and wherein said actuator is operable for moving said shift sleeve into and out of said third position.

13. The power transfer system of claim 12 wherein said shift sleeve is further movable to a fourth position whereat said input shaft is coupled to said first output member of said interaxle differential for establishing a two-wheel drive mode.

14. The power transfer system of claim 11 wherein said shift sleeve is further movable to a third position whereat said input shaft is coupled to said first output member of said interaxle differential for establishing a two-wheel drive mode.

15. The power transfer system of claim 11 wherein said first output member is a first sun gear, said second output member is a second sun gear, and said input member is a planet carrier rotatably supporting pinion gears meshed with said first and second sun gears.

16. The power transfer system of claim 11 further comprising a sector plate movable in response to actuation of said actuator, and a lever arm supported for movement between a first position whereat a minimum clutch engagement force is exerted on said transfer clutch for defining said non-actuated condition and a second position whereat a maximum clutch engagement force is exerted on said transfer clutch for defining said fully-actuated condition, and wherein said shift sleeve and said lever arm are coupled to said sector plate such that movement of said sector plate causes coordinated movement of said shift sleeve and said lever arm.

17. The power transfer system of claim 16 wherein said sensor detects the rotational speed of said first and second output shafts and respectively generates first and second speed signals indicative thereof, and wherein said controller receives said first and second speed signals and generates a speed differential signal that is indicative of a speed differential between said first and second output shafts, said controller being operable for controlling actuation of said actuator in accordance with said speed differential signal for moving said lever arm from said first position to said second position when said speed differential signal exceeds a predetermined value and for moving said lever arm from said second position to said first position when said speed differential signal is less than said predetermined value.

18. A power transfer system for a four-wheel drive vehicle having a power source and first and second drivelines, comprising:

a transfer case having an input shaft driven by the power source, a first output shaft coupled to the first driveline, a second output shaft coupled to the second driveline, an interaxle differential having a first output member fixed to said first output shaft, a second output member fixed to said second output shaft, and an input member driving said first and second output members while permitting speed differentiation therebetween, a transfer clutch operable in a non-actuated condition to permit unrestricted relative rotation between said first and second output shafts, and said transfer clutch is operable in a fully-actuated condition to inhibit relative rotation between said first and second output shafts, a shift sleeve supported for rotation with said input shaft and movement between first and second positions, said shift sleeve is operable in said first position to couple said input shaft to said input member of said interaxle differential for establishing a full-time four-wheel drive mode, and said shift sleeve is operable in said second position to uncouple said input shaft from said input member of said interaxle differential for establishing a neutral non-driven drive mode, and an actuator which is movable for controlling movement of said shift sleeve between said first and second positions and for controlling the actuated condition of said transfer clutch;

a sensor for detecting an operating characteristic of the vehicle and generating a sensor input signal in response thereto;

a mode selector for permitting selection of one of said full-time four-wheel drive mode and said neutral mode and for generating a mode signal indicative of the mode selected; and a controller for receiving said sensor input signal and said mode signal and controlling movement of said actuator in response thereto, said controller operable for varying the actuated condition of said transfer clutch between its non-actuated and fully-actuated conditions in accordance with the magnitude of said sensor input signal when said full-time four-wheel drive mode is selected.

19. The power transfer system of claim 18 wherein said shift sleeve is further movable to a third position whereat said input shaft is coupled to said first output member of said interaxle differential for establishing a two-wheel drive mode.

20. The power transfer system of claim 18 further comprising a sector plate movable in response to actuation of said actuator, and a lever arm supported for movement between a first position whereat a minimum clutch engagement force is exerted on said transfer clutch for defining said non-actuated condition and a second position whereat a maximum clutch engagement force is exerted on said transfer clutch for defining said fully-actuated condition, and wherein said shift sleeve and said lever arm are coupled to said sector plate such that movement of said sector plate causes coordinated movement of said shift sleeve and said lever arm.

* * * * *

UNITED STATES PATENT AND TRADEMARK OFFICE
CERTIFICATE OF CORRECTION

PATENT NO. : 6,071,207
DATED : June 6, 2000
INVENTOR(S) : Carl F. Stephens et al.

Page 1 of 1

It is certified that error appears in the above-identified patent and that said Letters Patent is hereby corrected as shown below:

<u>Title page,</u>
Item [75], Inventors, -- Anthony F. Musso, Auburn, N.Y. -- should be added as inventor.

<u>Column 19,</u>
Line 5, "int he" should be -- in the --

Signed and Sealed this

Third Day of September, 2002

*Attest:*

JAMES E. ROGAN
*Attesting Officer*  *Director of the United States Patent and Trademark Office*